(12) United States Patent
Wang et al.

(10) Patent No.: US 11,308,386 B2
(45) Date of Patent: Apr. 19, 2022

(54) SIGNAL PROCESSING METHOD AND APPARATUS BASED ON SPIKING NEURAL NETWORK

(71) Applicant: Huawei Technologies Co., Ltd., Shenzhen (CN)

(72) Inventors: Ming Wang, Shenzhen (CN); Zheng Yan, Shenzhen (CN); Xijun Xue, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 16/423,750

(22) Filed: May 28, 2019

(65) Prior Publication Data

US 2019/0286969 A1 Sep. 19, 2019

Related U.S. Application Data

(63) Continuation of application No. PCT/CN2016/107419, filed on Nov. 28, 2016.

(51) Int. Cl.
*G06N 3/04* (2006.01)
*G06N 3/063* (2006.01)
*G06N 3/08* (2006.01)
*G06N 3/02* (2006.01)

(52) U.S. Cl.
CPC ............. *G06N 3/049* (2013.01); *G06N 3/02* (2013.01); *G06N 3/0635* (2013.01); *G06N 3/084* (2013.01)

(58) Field of Classification Search
CPC ........ G06N 3/049; G06N 3/02; G06N 3/0635; G06N 3/084
See application file for complete search history.

(56) References Cited

U.S. PATENT DOCUMENTS

| | | | |
|---|---|---|---|
| 7,822,698 | B1 | 10/2010 | Cruz-Albrecht et al. |
| 2012/0011090 | A1 | 1/2012 | Tang et al. |
| 2013/0046716 | A1 | 2/2013 | Chan et al. |

(Continued)

FOREIGN PATENT DOCUMENTS

| | | |
|---|---|---|
| CN | 102663428 A | 9/2012 |
| CN | 102831476 A | 12/2012 |

(Continued)

OTHER PUBLICATIONS

Soltoggio et al., "Short-Term Plasticity as Cause-Effect Hypothesis Testing in Distal Reward Learning" (2014). (Year: 2014).*

(Continued)

*Primary Examiner* — Kamran Afshar
*Assistant Examiner* — Ryan C Vaughn
(74) *Attorney, Agent, or Firm* — Conley Rose, P.C.

(57) ABSTRACT

A signal processing method and apparatus includes determining a first signal $F_1(t)$ output by a first neuron, processing the first signal $F_1(t)$ using q orders of synapse weight parameters $w_q(t)$, $w_{q-1}(t)$, . . . , $w_1(t)$ to obtain a second signal $F_2(t)$, and inputting the second signal $F_2(t)$ to a second neuron, where the second neuron is in a layer immediately subsequent to that of the first neuron.

20 Claims, 8 Drawing Sheets

(56) References Cited

U.S. PATENT DOCUMENTS

| | | |
|---|---|---|
| 2013/0325777 A1 | 12/2013 | Petre et al. |
| 2016/0019453 A1* | 1/2016 | Klefenz .............. H01L 45/1253 706/26 |
| 2016/0034812 A1 | 2/2016 | Gibson et al. |
| 2018/0300611 A1 | 10/2018 | Kim et al. |

FOREIGN PATENT DOCUMENTS

| | | |
|---|---|---|
| CN | 103078055 A | 5/2013 |
| CN | 104899640 A | 9/2015 |
| CN | 105404902 A | 3/2016 |
| JP | 2013534676 A | 9/2013 |
| KR | 20160056779 A | 5/2016 |

OTHER PUBLICATIONS

Machine Translation and Abstract of Chinese Publication No. CN102663428, Sep. 12, 2012, 22 pages.

Machine Translation and Abstract of Chinese Publication No. CN102831476, Dec. 19, 2012, 16 pages.

Machine Translation and Abstract of Chinese Publication No. CN103078055, May 1, 2013, 30 pages.

Machine Translation and Abstract of Chinese Publication No. CN104899640, Sep. 9, 2015, 92 pages.

Machine Translation and Abstract of Chinese Publication No. CN105404902, Mar. 16, 2016, 19 pages.

Foreign Communication From A Counterpart Application, PCT Application No. PCT/CN2016/107419, English Translation of International Search Report dated Aug. 30, 2017, 2 pages.

Foreign Communication From A Counterpart Application, PCT Application No. PCT/CN2016/107419, English Translation of Written Opinion dated Aug. 30, 2017, 4 pages.

Kitano, K., "Introduction to Brain Simulation," Artificial intelligence, vol. 30, No. 5, Sep. 2015, 10 pages. With English abstract.

Ueda, M., et al. "Pattern recognition by analog computing using neuromorphic ferroelectric device," The 27th Annual Conference of the Japanese Society for Artificial Intelligence, 2013, 4 pages. With English abstract.

Hsieh, H., et al., "Hardware Friendly Probabilistic Spiking Neural Network With Long-Term and Short-Term Plasticity," XP011531413, IEEE Transactions of Neural Networks and Learning Systems, vol. 24, No. 12, Dec. 1, 2013, pp. 2063-2074.

Soltoggio, A., "Short-term plasticity as cause-effect hypothesis testing in distal reward learning," XP035439772, Biological Cybernetics, vol. 109, No. 1, Sep. 5, 2014, pp. 75-94.

Berdan, R., et al., "Emulating short-term synaptic dynamics with memristive devices," XP055439001, Scientific Reports, vol. 6, No. 1, Jan. 4, 2016, 9 pages.

Foreign Communication From A Counterpart Application, European Application No. 16922469.8, Extended European Search Report dated Nov. 13, 2019, 10 pages.

\* cited by examiner

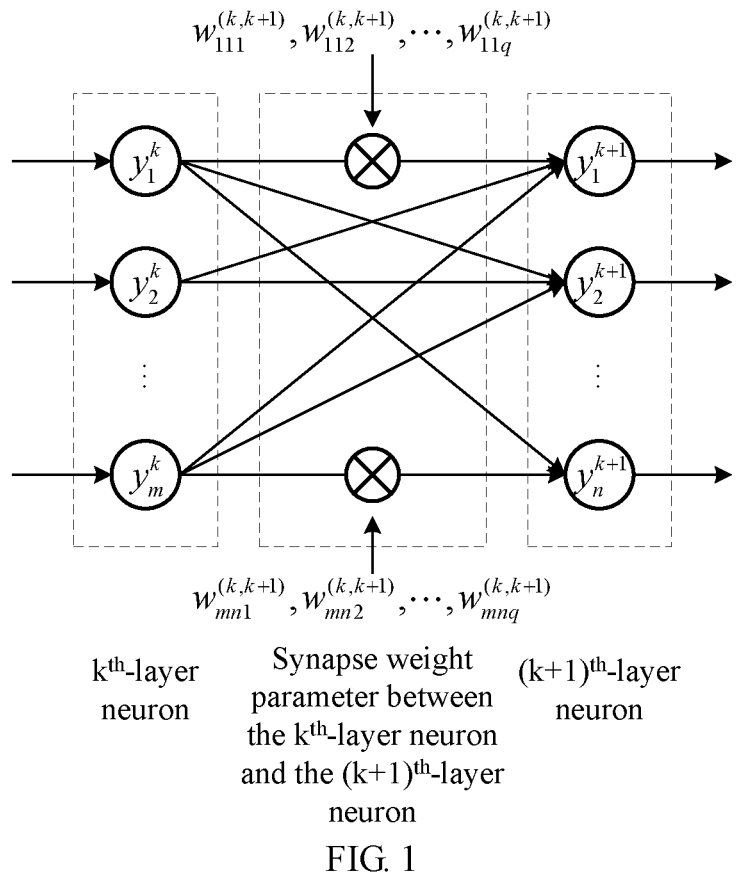

Determine a first signal $F_1(t)$ output by a first neuron — S110

Process the first signal $F_1(t)$ by using q orders of synapse weight parameters $w_q(t), w_{q-1}(t), \ldots, w_1(t)$, to obtain a second signal $F_2(t)$, where a speed at which an initial function $w_{x+1}^0(t)$ met by an $(x+1)^{th}$-order synapse weight parameter of the q orders of synapse weight parameters attenuates with time is higher than a speed at which an initial function $w_x^0(t)$ met by an xth-order synapse weight parameter attenuates with time, q is a positive integer greater than 1, and $1 \leq x \leq q-1$ — S120

Input the second signal $F_2(t)$ to a second neuron, where the second neuron is a next-layer neuron of the first neuron — S130

FIG. 2

SIGNAL PROCESSING METHOD AND APPARATUS BASED ON SPIKING NEURAL NETWORK

CROSS-REFERENCE TO RELATED APPLICATIONS

This application is a continuation of International Application No. PCT/CN2016/107419, filed on Nov. 28, 2016, the disclosure of which is hereby incorporated by reference in its entirety.

TECHNICAL FIELD

This application relates to the field of information technologies, and in particular, to a signal processing method and apparatus based on a spiking neural network.

BACKGROUND

A neural network is a computing system simulating a structure of a biological brain to process data. A large quantity of neurons (nerve cells) are complexly intertwined inside the biological brain, and a former neuron (a dendrite) is connected to a latter neuron (an axon) using a synapse structure to transfer information. Correspondingly, each node in a structure of the neural network may simulate one neuron and execute a specific operation, for example, an activation function. A connection between nodes is used to simulate a neural synapse, and a weight of the synapse represents strength of a connection between two neurons. The neural network has a strong nonlinear, adaptive, and fault-tolerant information processing capability.

An emerging spiking neural network may desirably resolve a real-time information processing problem. In the spiking neural network, information is transferred using a spatio-temporal information coding scheme for a spike signal of a neuron. An input behavior of the network is that a neuron receives a spike signal, and an output behavior of the network is that a neuron sends a spike signal. Neurons operate in parallel. Therefore, an operation manner of the spiking neural network is closer to that of a real biological system.

Spike-timing-dependent plasticity (STDP) is a relatively common learning method in the spiking neural network. The spike-timing-dependent plasticity describes a rule of adjusting a synapse weight between neurons If information about another neuron is generated before an activity of a current neuron, a connection between the another neuron and the current neuron is enhanced, or if information about another neuron is generated after an activity of a current neuron, a connection between the another neuron and the current neuron is weakened. The learning rule can desirably resolve a time-related information processing problem in the spiking neural network. Therefore, the real-time problem can be desirably processed.

In addition, the biological brain has a forgetting characteristic during learning. This is mainly because storage space of the brain is limited, and it is impossible for the brain to permanently store all received information. Therefore, some irrelevant information needs to be forgotten to improve information storage and processing efficiency. On the other hand, due to the forgetting characteristic, a learned unimportant feature or a learned interference signal feature may be "discarded", and an important feature of a thing is "stored" for long. Therefore, the forgetting characteristic of the biological brain is of great significance in actual application of the neural network. However, current development of a spiking neural network is still at an early stage, and a spiking neural network having a forgetting characteristic has not been implemented. Consequently, an existing spiking neural network needs relatively large information storage space, and processing efficiency is low, a key feature cannot be extracted, and the actual application is hindered.

SUMMARY

This application provides a signal processing method and apparatus based on a spiking neural network, to simulate a neural network based on a forgetting characteristic such that the neural network is more consistent with reality.

According to a first aspect, a signal processing method based on a spiking neural network is provided. The method includes determining a first signal $F_1(t)$ output by a first neuron, processing the first signal $F_1(t)$ using q orders of synapse weight parameters $w_q(t), w_{q-1}(t), \ldots, w_1(t)$, to obtain a second signal $F_2(t)$, where a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, q is a positive integer greater than 1, and $1 \leq x \leq q-1$, and inputting the second signal $F_2(t)$ to a second neuron, where the second neuron is a next-layer neuron of the first neuron.

Therefore, in the signal processing method based on a spiking neural network in this embodiment of this application, an input signal is processed using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved.

It should be understood that the first signal $F_1(t)$ is a spike signal.

It should be understood that an initial function is set for each order of synapse weight parameter of the q orders of synapse weight parameters $w_q(t), w_{q-1}(t), \ldots, w_1(t)$, and each order of synapse weight parameter meets the corresponding initial function when each order of synapse weight parameter is not stimulated.

It should be understood that a type of an initial function corresponding to any order of synapse weight parameter of the q orders of synapse weight parameters $w_q(t), w_{q-1}(t), \ldots, w_1(t)$ may be a nonlinear attenuation function such as an exponential function, a logarithmic function, or a step function, or may be a linear attenuation function, or may be a combination of any two or more of the foregoing function types.

With reference to the first aspect, in an implementation of the first aspect, an initial function $w_1^0(t)$ of a first-order synapse weight parameter of the q orders of synapse weight parameters does not attenuate with time.

With reference to the first aspect and the foregoing implementation, in another implementation of the first aspect, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ meets a condition (1):

$$w_q(t_1) = w_q(t_1-1) + \Delta F_q(t_1) \qquad (1)$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an updated quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and an $x^{th}$-order synapse weight parameter $w_x(t_1)$ at the moment $t_1$ meets a condition (2):

$$w_x(t_1)=w_x(t_1-1)+\Delta F_x(t_1)+\Delta w_{x,x+1}(t_1)+ \Delta w_{x,x+2}(t_1)+ \ldots +\Delta w_{x,q}(t_1) \qquad (2)$$

where $w_x(t_1-1)$ represents an $x^{th}$-order synapse weight parameter at the moment $t_1-1$, $\Delta F_x(t_1)$ is an updated quantity determined based on the learning rule and a stimulation effect, at the moment $t_1$, of the first sub-signal $F_1(t_1)$ on the $x^{th}$-order synapse weight parameter $w_x(t_1-1)$ at the moment $t_1-1$, $\Delta w_{x,x+1}(t_1)$, $\Delta w_{x,x+2}(t_1)+ \ldots +\Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

It should be understood that the moment $t_1$ may be any moment in a time period within which the first neuron outputs the first signal $F_1(t)$, and the first signal $F_1(t)$ includes the first sub-signal $F_1(t_1)$ output at the moment $t_1$.

It should be understood that for a moment $t_2$ after the time period within which the first neuron outputs the first signal $F_1(t)$, that the moment $t_2$ is any moment at which there is no stimulation effect of the first signal $F_1(t)$, the $q^{th}$-order synapse weight parameter meets an initial function $w_q^0(t_2)$ at the moment $t_2$.

With reference to the first aspect and the foregoing implementations, in another implementation of the first aspect, when an $(x+i)^{th}$-order synapse weight parameter $w_{x+i}(t_1)$ at the moment $t_1$ is greater than or equal to a threshold of an $(x+i)^{th}$-order synapse weight, $\Delta w_{x,x+i}(t_1)$ is not 0, or when an $(x+i)^{th}$-order synapse weight parameter $w_{x+i}(t_1)$ at the moment $t_1$ is less than a threshold of an $(x+i)^{th}$-order synapse weight, $\Delta w_{x,x+i}(t_1)$ is equal to 0, and i=1, 2, ..., or q-x.

It should be understood that for a moment $t_2$ after a time period within which the first neuron outputs the first signal $F_1(t)$, assuming that the moment $t_2$ is any moment at which there is no stimulation effect of the first signal $F_1(t)$, a quantity $\Delta F_x(t_2)$ of impact of the first signal $F_1(t)$ on an $x^{th}$-order synapse weight parameter at the moment $t_2$ is 0. If quantities $\Delta w_{x,x+1}(t_2), \Delta w_{x,x+2}(t_2), \ldots, \Delta w_{x,q}(t_2)$ of impact of an $(x+1)^{th}$-order synapse weight parameter, an $(x+2)^{th}$-order synapse weight parameter, ..., and the $q^{th}$-order synapse weight parameter on the $x^{th}$-order synapse weight parameter are not all 0 in this case, the $x^{th}$-order synapse weight parameter still meets the condition (2) at the moment $t_2$, or if quantities $\Delta w_{x,x+1}(t_2), \Delta w_{x,x+2}(t_2), \ldots, \Delta w_{x,q}(t_2)$ of impact of an $(x+1)^{th}$-order synapse weight parameter, an $(x+2)^{th}$-order synapse weight parameter, ..., and the $q^{th}$-order synapse weight parameter on the $x^{th}$-order synapse weight parameter are all equal to 0 in this case, the $x^{th}$-order synapse weight parameter meets an initial function $w_x^0(t_2)$ at the moment $t_2$.

It should be understood that the first sub-signal $F_1(t_1)$ at the moment $t_1$ may be set to affect all or some of the q orders of synapse weight parameters. For example, the first sub-signal $F_1(t_1)$ may be set to affect only the $q^{th}$-order synapse weight parameter. In other words, a quantity $\Delta F_q(t_1)$ of impact of the first sub-signal $F_1(t_1)$ on $q^{th}$-order synapse weight parameter is not 0, and a quantity $\Delta F_x(t_1)$ of impact of the first sub-signal $F_1(t_1)$ on the $x^{th}$-order synapse weight parameter other than the $q^{th}$-order synapse weight parameter is 0. For another example, the first sub-signal $F_1(t_1)$ may alternatively be set to affect only the $q^{th}$-order synapse weight parameter to a $(q-x)^{th}$-order synapse weight parameter. In other words, $\Delta F_q(t_1), \Delta F_{q-1}(t_1), \ldots,$ and $\Delta F_{q-x}(t_1)$ and are not 0, and $\Delta F_{q-x-1}(t_1), \Delta F_{q-x-2}(t_1), \ldots,$ and $\Delta F_1(t_1)$ are 0.

Optionally, for the condition (2), the $x^{th}$-order synapse weight parameter may be set to be related to each higher-order synapse weight parameter. That is, the $(x+1)^{th}$-order synapse weight parameter affects each lower-order synapse weight parameter. Alternatively, the $(x+1)^{th}$-order synapse weight parameter may be set to affect only some lower-order synapse weight parameters. For example, the $(x+1)^{th}$-order synapse weight parameter may be set to affect only the $x^{th}$-order synapse weight parameter that is one order lower than the $(x+1)^{th}$-order synapse weight parameter. In other words, the $x^{th}$-order synapse weight parameter is related to the $(x+1)^{th}$-order synapse weight parameter. In other words, $\Delta w_{x,x+2}(t_2), \Delta w_{x,x+3}(t_2), \ldots, \Delta w_{x,q}(t_2)$ are all 0 in the condition (2). For another example, the $x^{th}$-order synapse weight parameter may alternatively be set to be related to the $(x+1)^{th}$-order synapse weight parameter to the $(x+i)^{th}$-order synapse weight parameter. Therefore, $\Delta w_{x,x+i+1}(t_2), \Delta w_{x,x+i+2}(t_2), \ldots, \Delta w_{x,q}(t_2)$ are all 0.

With reference to the first aspect and the foregoing implementations, in another implementation of the first aspect, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ meets a condition (3):

$$w_q(t_1)=w_q(t_1-1)+\Delta F_q(t_1) \qquad (3)$$

where $w_q(t_1-1)$ represents a $q^{th}$-order synapse weight parameter at a moment $t_1-1$, the moment $t_1-1$ a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and when an $(x+1)^{th}$-order synapse weight parameter at the moment $t_1$ is greater than or equal to a threshold of an $(x+1)^{th}$-order synapse weight, an $x^{th}$-order synapse weight parameter $w_x(t_1)$ at the moment $t_1$ meets a condition (4):

$$w_x(t_1)=w_x(t_1-1)+\Delta w_{x,x+1}(t_1) \qquad (4)$$

where $w_x(t_1-1)$ represents an $x^{th}$-order synapse weight parameter at the moment $t_1-1$, $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$, or when an $(x+1)^{th}$-order synapse weight parameter $w_{x+1}(t_1)$ the moment $t_1$ is less than a threshold of an $(x+1)^{th}$-order synapse weight, an $x^{th}$-order synapse weight parameter $w_x(t_1)$ at the moment $t_1$ meets an initial function $w_x^0(t_1)$.

With reference to the first aspect and the foregoing implementations, in another implementation of the first aspect, the learning rule is a learning rule based on a biological feature or a supervised learning rule based on an error back propagation mechanism.

The learning rule based on a biological feature may be, for example, an STDP learning rule or a Hebb learning rule. The supervised learning algorithm based on the error back propagation mechanism may be, for example, a SpikeProp learning rule, a QuickProp learning rule, a Tempotron learning rule, or an E-Learning learning rule.

With reference to the first aspect and the foregoing implementations, in another implementation of the first aspect, the processing the first signal $F_1(t)$ using q orders of synapse weight parameters $w_q(t), w_{q-1}(t), \ldots, w_1(t)$, to obtain a second signal $F_2(t)$ includes determining a product of the first signal $F_1(t)$ and the first-order synapse weight parameter $w_1(t)$ as the second signal $F_2(t)$.

According to a second aspect, a signal processing apparatus based on a spiking neural network is provided, configured to perform the method in the first aspect or any possible implementation of the first aspect. The apparatus includes units configured to perform the method in the first aspect or any possible implementation of the first aspect.

According to a third aspect, a signal processing apparatus based on a spiking neural network is provided, including a memory and a processor. The memory is configured to store an instruction. The processor is configured to execute the instruction stored in the memory, and when the processor executes the instruction stored in the memory, the processor performs the method in the first aspect or any possible implementation of the first aspect.

According to a fourth aspect, a computer readable medium is provided, configured to store a computer program, where the computer program includes an instruction used to perform the method in the first aspect or any possible implementation of the first aspect.

BRIEF DESCRIPTION OF DRAWINGS

FIG. 1 is a schematic diagram of a spiking neural network according to an embodiment of the present disclosure.

FIG. 2 is a schematic flowchart of a signal processing method based on a spiking neural network according to an embodiment of the present disclosure.

DESCRIPTION OF EMBODIMENTS

Figure 3:
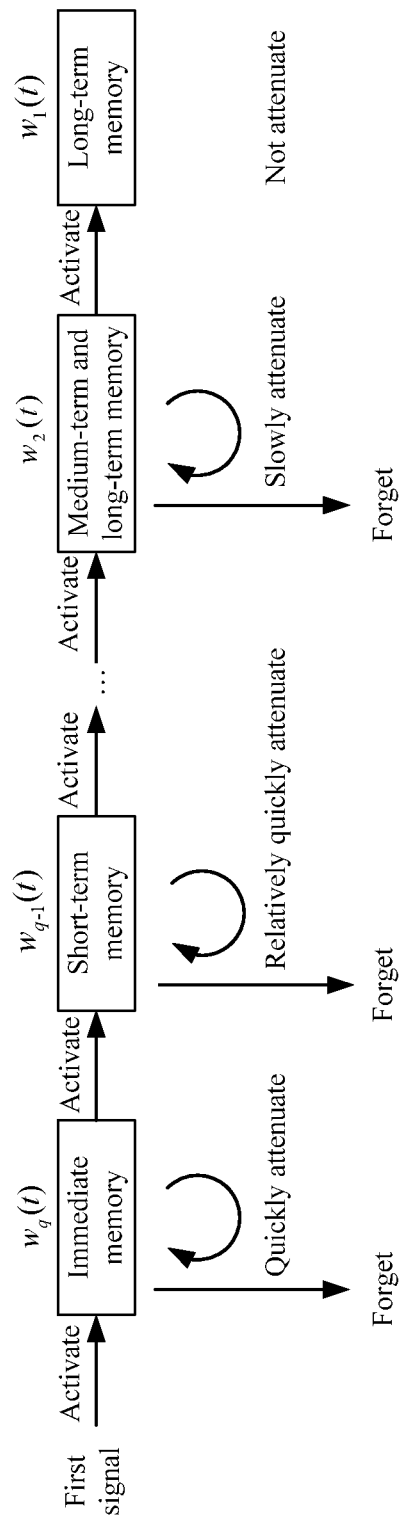
FIG. 3 is a schematic diagram of a memory effect corresponding to each order of a synapse weight parameter according to an embodiment of the present disclosure.

The following describes technical solutions in the embodiments of the present disclosure with reference to the accompanying drawings.

FIG. 1 is a schematic diagram of a spiking neural network according to an embodiment of the present disclosure. As shown in FIG. 1, a $k^{th}$-layer neuron is a neuron at any layer in the spiking neural network, the $k^{th}$-layer neuron may include m neurons, and m is a positive integer. A $(k+1)^{th}$-layer neuron is a next-layer neuron of the $k^{th}$-layer neuron, the $(k+1)^{th}$-layer neuron may include n neurons, n is a positive integer, and m and n may or may not be equal. There is a synapse weight parameter between the $k^{th}$-layer neuron and the $(k+1)^{th}$-layer neuron. A signal output by the $k^{th}$-layer neuron is processed using the synapse weight parameter, and is input to the $(k+1)^{th}$-layer neuron.

Optionally, each $k^{th}$-layer neuron does not need to have a connection relationship with each $(k+1)^{th}$-layer neuron in the spiking neural network. In other words, at least one of the $k^{th}$ layer neurons may alternatively have no connection relationship with at least one of the $(k+1)^{th}$ layer neurons.

In this embodiment of the present disclosure, there may be a plurality of orders of synapse weight parameters between the $k^{th}$-layer neuron and the $(k+1)^{th}$-layer neuron. In other words, for any neuron $y_j^k$ of the $k^{th}$-layer neuron and any neuron $y_j^{k+1}$ of the $(k+1)^{th}$-layer neuron that have a connection relationship, there may be q orders of synapse weight parameters between the two neurons, where the q orders of synapse weight parameters may be expressed as $w_{ij1}^{(k,k+1)}$, $w_{ij2}^{(k,k+1)}) \ldots, w_{ijq}^{(k,k+1)}$, and q is a positive integer greater than 2. In addition, when different values are chosen for i and/or different values are chosen for j, the corresponding q may be set to a same value or different values. For example, there may be q orders of synapse weight parameters between a first neuron $y_1^k$ of the $k^{th}$-layer neuron and a first neuron $y_1^{k+1}$ of the $(k+1)^{th}$-layer neuron, where q may be 5, that is, $w_{111}^{(k,k+1)}, w_{112}^{(k,k+1)}, \ldots w_{115}^{(k,k+1)}$. For another example, there may be q orders of synapse weight parameters between an $m^{th}$ neuron $y_m^k$ of the $k^{th}$-layer neuron and an $n^{th}$ neuron $y_n^{k+1}$ of the $(k+1)^{th}$-layer neuron, where q may be 3, that is, $w_{mn1}^{(k,k+1)}, w_{mn2}^{(k,k+1)}, \ldots w_{mn3}^{(k,k+1)}$.

In this embodiment of the present disclosure, the q orders of synapse weight parameters $w_{ij1}^{(k,k+1)}, w_{ij2}^{(k,k+1)}, \ldots, w_{ijq}^{(k,k+1)}$ between any neuron $y_i^k$ of the $k^{th}$-layer neuron and any neuron $y_j^{k+1}$ of the $(k+1)^{th}$-layer neuron are used as an example for description. For ease of representation, $w_1, w_2, \ldots, w_q$ are used in this specification to represent q orders of synapse weight parameters between neurons at any two adjacent layers.

FIG. 2 is a schematic flowchart of a signal processing method 100 based on a spiking neural network according to an embodiment of the present disclosure. As shown in FIG. 2, the method 100 includes the following steps.

S110: Determine a first signal $F_1(t)$ output by a first neuron.

S120: Process the first signal $F_1(t)$ using q orders of synapse weight parameters $w_q(t), w_{q-1}(t), \ldots, w_1(t)$, to obtain a second signal $F_2(t)$, where a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, q is a positive integer greater than 1, and $1 \leq x \leq q-1$.

S130: Input the second signal $F_2(t)$ to a second neuron, where the second neuron is a next-layer neuron of the first neuron.

Therefore, in the signal processing method based on a spiking neural network in this embodiment of the present disclosure, an input signal is processed using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved.

In S110, the first signal $F_1(t)$ output by the first neuron is determined. The first signal $F_1(t)$ is a spike signal. A signal input from the outside at any moment, that is, a signal needing to be input to a multilayer neural network, may be information such as an image, a word, or a sound that actually needs to be processed. Therefore, the signal may be first converted, using a spike signal conversion apparatus, into a spike signal that can be identified by the multilayer neural network. For example, the information may be encoded, using a spike encoding circuit, into a standard spike signal that can be identified by the multilayer neural network, and the spike signal is input to the multilayer neural network at the moment, to be processed.

Therefore, for a neuron at any layer of the neural network, for example, the first neuron, the spike signal is input to the neuron, and the neuron is activated such that the neuron outputs the first signal $F_1(t)$. $F_1(t)$ is also a spike signal.

In this embodiment of the present disclosure, each neuron in the neural network executes a specific operation, and sends the spike signal in a particular manner after processing the received spike signal. Optionally, a neuron may be a physical model. For example, a neuron physical model may be a simple activation model, a leaky integrate and fire (LIF) model, a Hodgkin-Huxley (HH) model, or the like. These models may all be implemented using corresponding physical circuits. For example, as shown in FIG. 1, any neuron $y_j^{k+1}$ of the $(k+1)^{th}$-layer neuron may receive an effect of each of neurons $y_1^k, y_2^k, \ldots, y_l^k$ that are connected to $y_j^{k+1}$ and that are of $k^{th}$-layer neurons, in other words, upper-layer neurons. $y_1^k, y_2^k, \ldots, y_l^k$ are neurons that are connected to $y_j^{k+1}$ and that are of the $k^{th}$-layer neurons, and transfer spike signals to the neuron $y_j^{k+1}$ using a corresponding synapse weight parameter. These spike signals are processed by the neuron $y_j^{k+1}$ to obtain $y_j^{k+1}=f(y_1^k, y_n^k, \ldots, y_l^k)$ and $y_j^{k+1}=f(y_1^k, y_2^k, \ldots, y_l^k)$ is then transferred to the next-layer neuron.

Therefore, the first signal $F_1(t)$ output by the first neuron in the neural network is a spike signal that is output after the first neuron processes a signal input by an upper-layer neuron.

In S120, the first signal $F_1(t)$ is processed using the q orders of synapse weight parameters $w_q(t), w_{q-1}(t), \ldots, w_1(t)$ to obtain the second signal $F_2(t)$. The speed at which the initial function $w_{x+1}^0(t)$ met by the $(x+1)^{th}$-order synapse weight parameter of the q orders of synapse weight parameters attenuates with time is higher than the speed at which the initial function $w_x^0(t)$ met by the $x^{th}$-order synapse weight parameter attenuates with time, where q is a positive integer greater than 1, and $1 \le x \le q-1$.

It should be understood that the first signal $F_1(t)$ is processed using the q orders of synapse weight parameters $w_q(t), w_{q-1}(t), \ldots, w_1(t)$. When each order of synapse weight parameter of the q orders of synapse weight parameters is subject to no effect of a stimulation signal, all the q orders of synapse weight parameters are set to meet corresponding initial functions $w_q^0(t), w_{q-1}^0(t), \ldots, w_1^0(t)$. The speed at which the initial function $w_{x+1}^0(t)$ met by the $(x+1)^{th}$-order synapse weight parameter of the q orders of synapse weight parameters attenuates with time is higher than the speed at which the initial function $w_x^0(t)$ met by the $x^{th}$-order synapse weight parameter attenuates with time. Optionally, an initial function $w_1^0(t)$ of a first-order synapse weight parameter of the q orders of synapse weight parameters is set to a function that does not attenuate with time.

For example, as shown in FIG. 3, the first-order synapse weight parameter corresponds to a long-term memory effect in other words, $w_1^0(t)$ does not attenuate with time. A second-order synapse weight parameter corresponds to a mid-and-long term memory effect; in other words, $w_2^0(t)$ slowly attenuates with time. By analogy, a $q^{th}$-order synapse weight parameter corresponds to an immediate memory effect; in other words, a speed at which $w_q^0(t)$ attenuates with time is the largest.

Optionally, when initial functions are set for the q orders of synapse weight parameters, a type of an initial function of each order of synapse weight parameter may be a nonlinear attenuation function such as an exponential function, a logarithmic function, or a step function, or may be a linear attenuation function, or may be a combination of any two or more of the foregoing function types. The initial functions of the orders of synapse weight parameters may be set to a same type, for example, an exponential function. Alternatively, the initial functions of the orders of synapse weight parameters may be set to different types. For example, initial functions of some synapse weight parameters are linear attenuation functions, and initial functions of other synapse weight parameters are set to logarithmic functions. This is not limited in this embodiment of the present disclosure.

In this embodiment of the present disclosure, after the first neuron outputs the first signal $F_1(t)$, all or some of the q orders of synapse weight parameters are activated with a stimulation effect of the first signal. For example, a moment $t_1$, in a time period within which the first neuron outputs the first signal $F_1(t)$, is used as an example. That is, the first signal $F_1(t)$ may include a first sub-signal $F_1(t_1)$ output by the first neuron at the moment $t_1$, and the first sub-signal $F_1(t_1)$ may activate each order or some of the q orders of synapse weight parameters.

For a highest-order synapse weight parameter, that is, the $q^{th}$-order synapse weight parameter $w_q(t_1)$, with a stimulation effect of the first sub-signal $F_1(t_1)$, $w_q(t_1)$ meets the following formula (1):

$$w_q(t_1) = w_q(t_1-1) + \Delta F_q(t_1) \qquad (1)$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$.

It should be understood that for a moment $t_2$ after the time period within which the first neuron outputs the first signal $F_1(t)$, assuming that the moment $t_2$ is any moment at which there is no stimulation effect of the first signal $F_1(t)$, the $q^{th}$-order synapse weight parameter meets an initial function $w_q^0(t_2)$ at the moment $t_2$.

In this embodiment of the present disclosure, for other orders of synapse weight parameters except the highest-order synapse weight parameter, that is, an $x^{th}$-order synapse weight parameter $w_x(t_1)$, where $1 \leq x \leq q-1$, with a stimulation effect of the first sub-signal $F_1(t_1)$, $w_x(t_1)$ meets the following formula (2):

$$w_x(t_1) = w_x(t_1-1) + \Delta F_x(t_1) + \Delta w_{x,x+1}(t_1) + \Delta w_{x,x+2}(t_1) + \ldots + \Delta w_{x,q}(t_1) \quad (2)$$

where $w_x(t_1-1)$ represents an $x^{th}$-order synapse weight parameter at the moment $t_1-1$, $\Delta F_x(t_1-1)$ is an update quantity determined based on a learning rule and a stimulation effect, at the moment $t_1$, of the first sub-signal $F_1(t_1)$ on the $x^{th}$-order synapse weight parameter $w_x(t_1-1)$ at the moment $t_1-1$, $\Delta w_{x,x+1}(t_1), \Delta w_{x,x+2}(t_1), \ldots, \Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

It should be understood that when an $(x+i)^{th}$-order synapse weight parameter $w_{x+i}(t_1)$ at the moment $t_1$ is greater than or equal to a threshold of an $(x+i)^{th}$-order synapse weight $\Delta w_{x,x+i}$, $(t_1)$ is not 0, or when an $(x+i)^{th}$-order synapse weight parameter $w_{x+i}(t_1)$ at the moment $t_1$ is less than a threshold of an $(x+i)^{th}$-order synapse weight, $\Delta w_{x,x+i}(t_1)$ is equal to 0, and $i=1, 2, \ldots,$ or $q-x$.

The $q^{th}$-order synapse weight parameter changes due to the stimulation effect of the first sub-signal $F_1(t_1)$ at the moment $t_1$. When the $q^{th}$-order synapse weight parameter $w_q(t_1)$ is greater than or equal to a threshold of a corresponding $q^{th}$-order synapse weight, the $q^{th}$-order synapse weight parameter may activate other $(q-1)$ orders of synapse weight parameters; in other words, $\Delta w_{x,q}(t_1)$ is not 0. Similarly, for any $(x+i)^{th}$-order synapse weight parameter $w_{x+i}(t_1)$, when $w_{x+i}(t_1)$ is greater than or equal to a threshold of an $(x+i)^{th}$-order synapse weight, $\Delta w_{x,x+i}(t_1)$ is not 0.

Optionally, if the $q^{th}$-order synapse weight parameter changes due to the stimulation effect of the first sub-signal $F_1(t_1)$ at the moment $t_1$, but is less than a threshold of a corresponding $q^{th}$-order synapse weight, the $q^{th}$-order synapse weight parameter does not activate other $(q-1)$ orders of synapse weight parameters; in other words, $\Delta w_{x,q}(t_1)$ is equal to 0. Similarly, for any $(x+i)^{th}$-order synapse weight parameter $w_{x+i}(t_1)$, when $w_{x+i}(t_1)$ is less than a threshold of an $(x+i)^{th}$-order synapse weight, $\Delta w_{x,x+i}(t_1)$ is 0.

In this embodiment of the present disclosure, a corresponding threshold is set for each order of synapse weight parameter of the q orders of synapse weight parameters, and the threshold may be set according to an actual situation. No limitation is set thereto in this embodiment of the present disclosure.

It should be understood that for a moment $t_2$ after a time period within which the first neuron outputs the first signal $F_1(t)$, assuming that the moment $t_2$ is any moment at which there is no stimulation effect of the first signal $F_1(t)$, a quantity $\Delta F_x(t_2)$ of impact of the first signal $F_1(t)$ on the $x^{th}$-order synapse weight parameter at the moment $t_2$ is 0. If quantities $\Delta w_{x,x+1}(t_2), \Delta w_{x,x+2}(t_2), \ldots, \Delta w_{x,q}(t_2)$ of impact of an $(x+1)^{th}$-order synapse weight parameter, an $(x+2)^{th}$-order synapse weight parameter, ..., and the $q^{th}$-order synapse weight parameter on the $x^{th}$-order synapse weight parameter are not all 0 in this case, the $x^{th}$-order synapse weight parameter still meets the formula (2) at the moment $t_2$, or if quantities $\Delta w_{x,x+1}(t_2), \Delta w_{x,x+2}(t_2), \ldots, \Delta w_{x,q}(t_2)$ of impact of an $(x+1)^{th}$-order synapse weight parameter, an $(x+2)^{th}$-order synapse weight parameter, ..., and the $q^{th}$-order synapse weight parameter on the $x^{th}$-order synapse weight parameter are all equal to 0 in this case, the $x^{th}$-order synapse weight parameter meets an initial function $w_x^0(t_2)$ at the moment $t_2$.

In this embodiment of the present disclosure, the update quantity $\Delta F_q(t_1)$ and the update quantity $\Delta F_x(t_1)$ are determined in the formulas (1) and (2) based on the learning rule and the first sub-signal $F_1(t_1)$. The learning rule herein may be an existing related learning rule. For example, the learning rule may be a learning rule based on a biological feature such as an STDP learning rule or a Hebb learning rule. Alternatively, the learning rule may be a supervised learning algorithm based on an error back propagation mechanism, for example, a SpikeProp learning rule, a QuickProp learning rule, a Tempotron learning rule, or an E-Learning learning rule. No limitation is set thereto in this embodiment of the present disclosure.

It should be understood that the first sub-signal $F_1(t_1)$ at the moment $t_1$ may be set to affect all or some of the q orders of synapse weight parameters. For example, the first sub-signal $F_1(t_1)$ may be set to affect only the $q^{th}$-order synapse weight parameter. In other words, a quantity $\Delta F_q(t_1)$ of impact of the first sub-signal $F_1(t_1)$ on the $q^{th}$-order synapse weight parameter is not 0, and a quantity $\Delta F_x(t_1)$ of impact of the first sub-signal $F_1(t_1)$ on the $x^{th}$-order synapse weight parameter other than the $q^{th}$-order synapse weight parameter is 0. For another example, the first sub-signal $F_1(t_1)$ may alternatively be set to affect only the $q^{th}$-order synapse weight parameter to a $(q-x)^{th}$-order synapse weight parameter. In other words, $\Delta F_q(t_1), \Delta F_{q-1}(t_1), \ldots,$ and $\Delta F_{q-x}(t_1)$ are not 0, and $\Delta F_{q-x-1}(t_1), \Delta F_{q-x-2}(t_1), \ldots,$ and $\Delta F_1(t_1)$ are 0.

Similarly, for the formula (2), the $x^{th}$-order synapse weight parameter is set to be related to each higher-order synapse weight parameter. That is, the $(x+1)^{th}$-order synapse weight parameter affects each lower-order synapse weight parameter. In other words, the $(x+1)^{th}$-order synapse weight parameter affects the $x^{th}$-order synapse weight parameter to the first-order synapse weight parameter. Optionally, the $(x+1)^{th}$-order synapse weight parameter may alternatively be set to affect only some lower-order synapse weight parameters. For example, the $(x+1)^{th}$-order synapse weight parameter may be set to affect only the $x^{th}$-order synapse weight parameter that is one order lower than the $(x+1)^{th}$-order synapse weight parameter. In other words, the $x^{th}$-order synapse weight parameter is related to the $(x+1)^{th}$-order synapse weight parameter. In other words, $\Delta w_{x,x+2}(t_2), \Delta w_{x,x+3}(t_2), \ldots, \Delta w_{x,q}(t_2)$ are all 0 in the formula (2).

For another example, the $x^{th}$-order synapse weight parameter may alternatively be set to be related to the $(x+1)^{th}$-order synapse weight parameter to the $(x+i)^{th}$-order synapse weight parameter. Therefore, $\Delta w_{x,x+i+1}(t_2), \Delta w_{x,x+i+2}(t_2), \ldots, \Delta w_{x,q}(t_2)$ are all 0.

Preferably, in an embodiment, any moment, for example, a moment $t_1$, in a time period within which the first neuron outputs the first signal $F_1(t)$ is used as an example. That is, the first signal $F_1(t)$ includes the first sub-signal $F_1(t_1)$ output by the first neuron at the moment $t_1$. In this case, the first sub-signal $F_1(t_1)$ may be set to be capable of activating only the highest-order synapse weight parameter of the q orders of synapse weight parameters. In other words, the $q^{th}$-order synapse weight parameter $w_q(t_1)$ still meets the formula (1) at the moment $t_1$. $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$, on the $q^{th}$-order synapse weight parameter, $w_q(t_1-1)$ at the moment $t_1-1$.

However, for other orders of synapse weight parameters except the highest-order synapse weight parameter, that is, the $x^{th}$-order synapse weight parameter $w_x(t_1)$, where $1 \leq x \leq q-1$, the $x^{th}$-order synapse weight parameter $w_x(t_1)$ may be set to be unrelated to the first sub-signal $F_1(t_1)$; in other words, $\Delta F_x(t_1)$ in the formula (2) is set to 0. However, the $x^{th}$-order synapse weight parameter $w_x(t_1)$ is related only to a value of the $(x+1)^{th}$-order synapse weight parameter, and a higher-order synapse weight parameter is set to affect only a synapse weight parameter that is one order lower than the higher-order synapse weight parameter.

When the $(x+1)^{th}$-order synapse weight parameter $w_{x+1}(t_1)$ at the moment $t_1$ is less than a threshold of an $(x+1)^{th}$-order synapse weight, the $x^{th}$-order synapse weight parameter $w_x(t_1)$ at the moment $t_1$ meets an initial function $w_x^0(t_1)$. Alternatively, when the $(x+1)^{th}$-order synapse weight parameter $w_{x+1}(t_1)$ at the moment $t_1$ is greater than or equal to a threshold of an $(x+1)^{th}$-order synapse weight, the $x^{th}$-order synapse weight parameter $w_x(t_1)$ at the moment $t_1$ meets a formula (3):

$$w_x(t_1) = w_x(t_1-1) + \Delta w_{x,x+1}(t_1) \qquad (3)$$

where $w_x(t_1-1)$ represents an $x^{th}$-order synapse weight parameter at the moment $t_1-1$, $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$.

FIG. 3 is used as an example, and when the first neuron outputs the first sub-signal $F_1(t_1)$ at the moment $t_1$, the first sub-signal directly acts on a $q^{th}$ synapse connected to the first neuron, that is, activates an immediate memory $q^{th}$-order synapse weight parameter $w_q(t_1)$. When the immediate memory $w_q(t_1)$ is greater than or equal to a threshold of a corresponding $q^{th}$-order synapse weight, immediate memory that is one order lower than the immediate memory $w_q(t_1)$ is activated, that is, a $(q-1)^{th}$ synapse weight parameter $w_{q-1}(t_1)$ meets the formula (3). Another case can be obtained by analogy until long-term memory is activated, in other words, the first synapse weight parameter is activated.

It should be understood that if the first signal $F_1(t)$ no longer exists at any moment, for example, the moment $t_2$, but a higher-order synapse weight parameter $w_{x+1}(t_2)$ is still greater than or equal to the threshold of the corresponding $(x+1)^{th}$-order synapse weight, $w_{x+1}(t_2)$ may still activate a synapse weight parameter that is one order lower than the higher-order synapse weight parameter $w_{x+1}(t_2)$. In other words, the $x^{th}$-order synapse weight parameter $w_x(t_2)$ still meets the formula (3), and it is set that $t_1 = t_2$.

In this embodiment of the present disclosure, q-order synapse weights are determined based on the foregoing process, and the first signal $F_1(t)$ output by the first neuron is processed using the q orders of synapse weight parameters $w_q(t), w_{q-1}(t), \ldots, w_1(t)$, to obtain the second signal $F_2(t)$. Optionally, the first signal $F_1(t)$ may be multiplied by the first-order synapse weight parameter $w_1(t)$, to obtain the second signal $F_2(t)$. However, no limitation is set thereto in this embodiment of the present disclosure.

Figure 4:
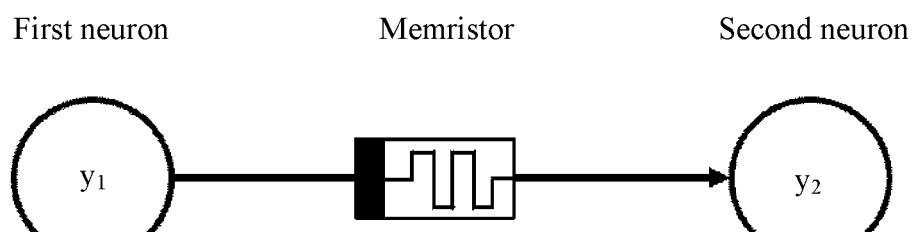
FIG. 4 is a schematic diagram of a form of a connection between two neurons according to an embodiment of the present disclosure.

In this embodiment of the present disclosure, any two neurons are connected using a multi-order synapse. The multi-order synapse may be physically implemented using one or more memristor units, or may be physically implemented using a complex synapse circuit. FIG. 4 is used as an example, and FIG. 4 shows an instance in which two neurons are connected using one memristor unit. To implement a function of the multi-order synapse, the memristor unit also needs to have a multi-order effect. For example, two orders of synapse weight parameters are used as an example. Therefore, the memristor unit is a memristor unit having a two-order effect.

Figure 5:
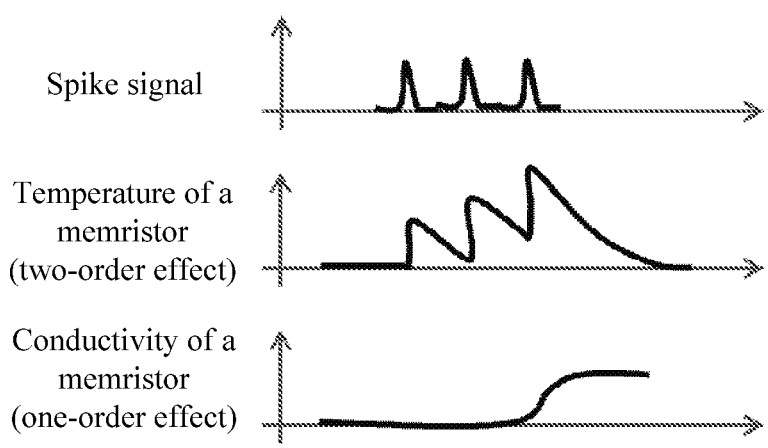
FIG. 5 is a schematic diagram of simulating a synapse weight parameter by a memristor having a two-order effect according to an embodiment of the present disclosure.

As shown in FIG. 5, the first signal $F_1(t)$ output by the first neuron $y_1$ may be a spike signal shown in FIG. 5, and the spike signal acts on a two-order memristor. The spike signal triggers a change in a conductivity value of the memristor. The process is a complex physical process. A direct effect of the spike signal is to trigger a change in local temperature of the memristor. When the spike signal is removed, the local temperature promptly recovers to a balance state, for example, by heat dissipation. This is equivalent to a short-term memory effect of a synapse weight parameter. That is, the change in the temperature of the memristor corresponds to a change in a second-order synapse weight parameter. When accumulated local temperature is excessively high, the conductivity value of the memristor is induced to permanently change. This is equivalent to a long-term memory effect of a synapse weight parameter. That is, a conductivity change in the memristor corresponds to a change in the first-order synapse weight parameter when the second-order synapse weight parameter exceeds a threshold. In this way, the single memristor unit may complete a synapse effect corresponding to the two orders of synapse weight parameters.

In S130, the second signal $F_2(t)$ is input to the second neuron, and the second neuron is a neuron in a layer immediately subsequent to that of the first neuron. The first neuron is used as a former neuron, and sends the spike signal, that is, the first signal, to the second neuron using the q-order synapses. The second neuron is used as a latter neuron.

It should be understood that if the latter neuron is not in a last-layer network, that is, the latter neuron is not at an output layer, the signal is transferred to a next-layer network. In this case, the latter neuron may be considered as a former neuron of the next-layer network. A signal transfer manner is the same as the foregoing signal transfer manner. In other words, an original second neuron may be considered as the first neuron, and a next neuron of the original second neuron is the second neuron. In addition, a spike signal input by an original latter neuron used as a former neuron not only includes a spike signal input from the outside, but also includes a spike signal output by a previous network. This part may be considered as cyclic network layering training of the spiking neural network. It should be noted that when a signal is transferred between networks, a time difference may exist.

In this embodiment of the present disclosure, if the second neuron is a neuron in the last-layer network, after the second signal $F_2(t)$ is input to the second neuron, the second neuron processes the second signal and outputs a result. Correspondingly, an original signal of the signal before the signal enters the neural network may be information such as an image, a word, or a sound that actually needs to be processed, and may be first converted, using a spike signal conversion apparatus, into a spike signal that can be identified by the multilayer neural network, and then processed through the neural network. Similarly, after processing the signal, the last-layer neuron may convert the spike signal into actual information using the spike signal conversion apparatus and output the actual information such as an image, a word, or a sound. Optionally, the spike signal conversion apparatus may be a spike decoding circuit and convert the spike signal into information such as an image, a word, or a sound.

Therefore, in the signal processing method based on a spiking neural network in this embodiment of the present disclosure, an input signal is processed using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved.

The signal processing method based on a spiking neural network in this embodiment of the present disclosure is described below in detail using several actual application scenarios as examples.

Embodiment 1

For example, as shown in FIG. 1, it is assumed that there are two orders of synapse weight parameters $(w_1, w_2)$ between any neuron $y_i^k$ of a $k^{th}$ layer and any neuron $y_j^{k+1}$ of a $(k+1)^{th}$ layer, $w_1$ is a first-order synapse weight parameter, and represents long-term memory, and an initial function of $w_1$ is set to a function that does not attenuate with time, and an initial value of $w_1$ may be set to $w_1^0(t)=0$ herein, in other words, the initial value remains 0 when $w_1$ is subject to no stimulation effect, $w_2$ is a second-order synapse weight parameter, and represents immediate memory, and an initial function of $w_2$ is set to a function that attenuates with time, and is expressed as the following formula (4):

$$w_2^0(t) = w_2(t_0)\exp[(t_0-t)/t_0](t \geq t_0) \quad (4)$$

where $t_0$ represents a moment at which a highest-order synapse weight parameter changes based on a related learning rule when signals of a former neuron and a latter neuron act on a synapse weight parameter together, and the highest-order synapse weight parameter herein is $w_2$, in addition, for $t < t_0$, the second-order synapse weight parameter may be set to 0.

The long-term memory first-order synapse weight parameter $w_1$ changes when and only when the immediate memory second-order synapse weight parameter $w_2$ is greater than or equal to a threshold of a second-order synapse weight. The long-term first-order synapse weight parameter $w_1$ may be expressed as the following formula (5):

$$w_1(t) = w_1(t-1) + \Delta w_1(t)$$

$$\Delta w_1(t) = [w_2(t) - 7.5] * \Delta t \quad w_2(t) \geq 7.5$$

$$\Delta w_1(t) = 0 \quad w_2(t) < 7.5 \quad (5)$$

where 7.5 is the threshold of the second-order synapse weight.

Figure 6:
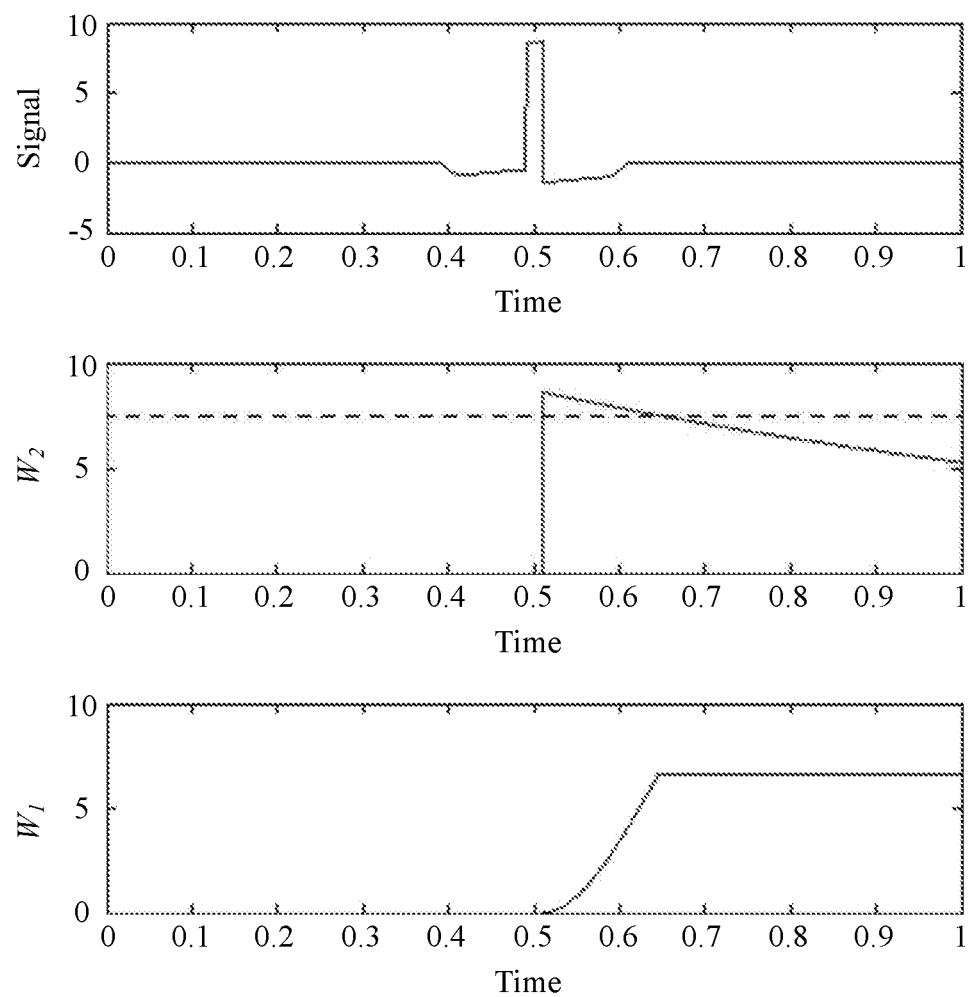
FIG. 6 is a schematic diagram of an application instance of two orders of synapse weight parameters according to an embodiment of the present disclosure.

Specific calculation values in FIG. 6 may be used as an example. As shown in FIG. 6, when $t<0.5$, the initial value of the long-term first-order synapse weight parameter $w_1$ and an initial value of the immediate memory second-order synapse weight parameter $w_2$ are both set to 0. When $t=0.5$, a former neuron outputs a signal to a synapse. With an effect of the signal, the immediate memory second-order synapse weight parameter $w_2$ changes based on an STDP learning rule.

Because the threshold of the second-order synapse weight is set to 7.5, with a stimulation effect of an input signal, as shown in FIG. 6, the immediate memory second-order synapse weight parameter $w_2$ exceeds the threshold 7.5 when $t=0.5$. Therefore, when $t=0.5$, the first-order synapse weight parameter $w_1$ is activated, and a change in the first-order synapse weight parameter $w_1$ meets the formula (5).

When $t=t+1$, a next moment is entered, and the input signal is removed. Therefore, the immediate memory second-order synapse weight parameter $w_2$ continuously attenuates based on a forgetting rule, in other words, continuously attenuates based on the specified initial function formula (4) with time, until the immediate memory second-order synapse weight parameter $w_2$ decreases to the initial value 0. At an initial stage of removing the stimulation signal, because the second-order synapse weight parameter $w_2$ is still greater than the threshold 7.5 set for the second-order synapse weight parameter $w_2$, the long-term memory first-order synapse weight parameter $w_1$ is continuously activated in this case. Therefore, the first-order synapse weight parameter $w_1$ continuously increases within a time period, until the immediate memory second-order synapse weight parameter is less than the threshold of the immediate memory second-order synapse weight parameter. Therefore, the first-order synapse weight parameter $w_1$ no longer increases, meets the specified initial function, and remains unchanged and no longer attenuates with time.

Figure 7:
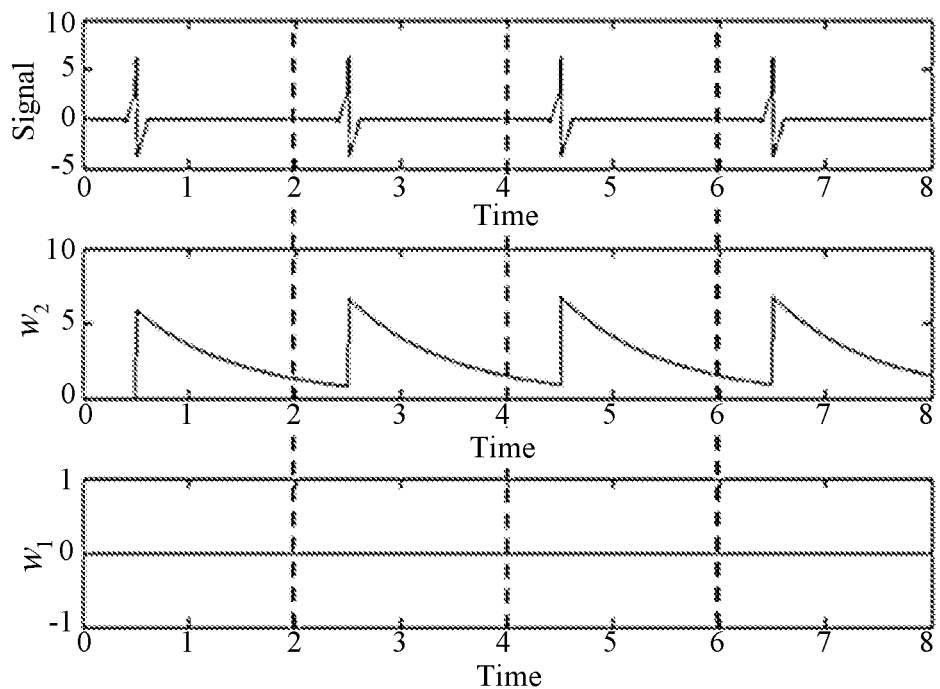
FIG. 7 is a schematic diagram of another application instance of two orders of synapse weight parameters according to an embodiment of the present disclosure.
Figure 8:
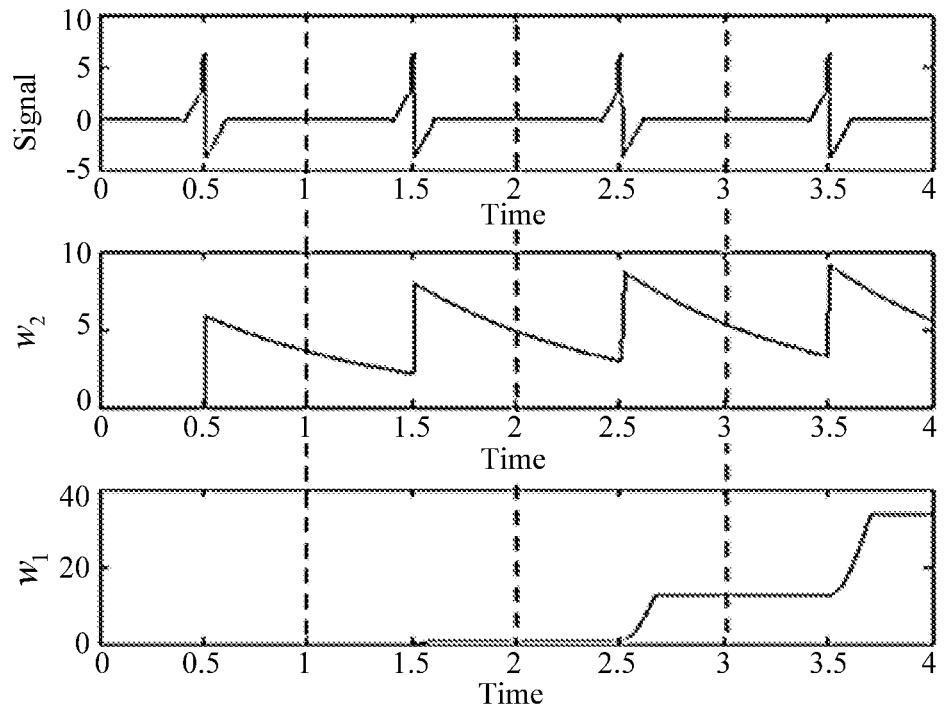
FIG. 8 is a schematic diagram of still another application instance of two orders of synapse weight parameters according to an embodiment of the present disclosure.

In this embodiment of the present disclosure, when stimulation signals output by the first neuron are different, effects on a synapse are different. In other words, changes corresponding to the orders of synapse weight parameters are different. For example, as shown in FIG. 7, a period of a stimulation signal acting on a synapse is 2s, and a period of a stimulation signal in FIG. 8 is 1s. Therefore, a corresponding immediate memory second-order synapse weight parameter $w_2$ increases during each time of stimulation, but quickly attenuates after the stimulation. When a next time of stimulation occurs, the second-order synapse weight parameter $w_2$ has not recovered to an initial value 0. Therefore, the second-order synapse weight parameter $w_2$ increases again based on a current status value at a current moment. In this way, an accumulative effect is formed. Both the stimulation in FIG. 7 and the stimulation in FIG. 8 are relatively weak, and a single time of stimulation does not trigger a change in a long-term memory first-order synapse weight parameter $w_1$. However, in FIG. 7, because stimulation frequency is relatively low, continuous stimulation still does not cause a second-order synapse weight parameter $w_2$ to exceed a threshold. Therefore, the change in the long-term memory first-order synapse weight parameter $w_1$ is not triggered. In other words, the first-order synapse weight parameter $w_1$ remains 0. However, when the stimulation frequency increases, as shown in FIG. 8, continuous stimulation may cause the second-order synapse weight parameter $w_2$ to exceed the threshold. Therefore, the change in the long-term memory first-order synapse weight parameter $w_1$ is triggered. This shows that frequent weak stimulation and infrequent strong stimulation have a same function, and the foregoing process conforms to biological cognitive habits. In other words, the multi-order neural network is closer to biological cognitive habits.

Embodiment 2

For example, as shown in FIG. 1, it is assumed that there are three orders of synapse weight parameters $(w_1, w_2, w_3)$ between any neuron $y_i^k$ of a $k^{th}$-layer neuron and any neuron $y_j^{k+1}$ of a $(k+1)^{th}$-layer neuron, $w_1$ is a first-order synapse weight parameter, and represents long-term memory, and an initial function of $w_1$ is set not to attenuate with time, $w_2$ is a second-order synapse weight parameter, and represents short-term memory, and an initial function of $w_2$ is set to relatively slowly attenuate with time, $w_3$ is a third-order synapse weight parameter, and represents immediate memory, and an initial function of $w_3$ is set to quickly attenuate with time.

The initial functions of the three orders of synapse weight parameters ($w_1$, $w_2$, $w_3$) may be set to the following functions. For a highest-order synapse weight parameter, that is, the third-order synapse weight parameter $w_3$, it is assumed that the third-order synapse weight parameter $w_3$ is subject to an effect of a stimulation signal at a moment $t_3$. For example, the stimulation signal may be a stimulation signal output by a former neuron. The third-order synapse weight parameter $w_3$ changes based on a learning rule. The third-order synapse weight parameter is no longer subject to new stimulation after the moment $t_3$. Therefore, the third-order synapse weight parameter $w_3$ quickly attenuates with time based on the specified initial function. It is assumed that the initial function herein is set to the following formula (6):

$$w_3^0(t) = w_3(t_3) \exp[(t_3-t)/(d_3 * t_3)] (t \geq t_3) \qquad (6)$$

where $d_3$ is an immediate memory attenuation factor, and $d_3 > 0$.

Similarly, for the second-order synapse weight parameter $w_2$, it is assumed that the second-order synapse weight parameter $w_2$ is not affected by a stimulation signal output by a neuron, and is related only to the third-order synapse weight parameter $w_3$ that is one order higher than the second-order synapse weight parameter $w_2$. Moreover, it is assumed that the third-order synapse weight parameter $w_3$ exceeds a threshold of a corresponding third-order synapse weight at a moment $t_2$ such that the second-order synapse weight parameter $w_2$ can be activated and change. After the moment $t_2$, the third-order synapse weight parameter $w_3$ is less than the threshold of the corresponding third-order synapse weight, and the second-order synapse weight parameter $w_2$ is no longer activated such that the second-order synapse weight parameter $w_2$ meets the initial function after the moment $t_2$, and relatively slowly attenuates with time, and a speed at which the initial function attenuates is less than a speed at which the third-order synapse weight parameter $w_3$ attenuates. Optionally, the initial function may be set to the following formula (7):

$$w_2^0(t) = w_2(t_2) \exp[(t_2-t)/(d_2 * t_2)] (t \geq t_2) \qquad (7)$$

where $d_2$ is an immediate memory attenuation factor, and $d_3 > d_2 > 0$.

Similarly, for a lowest-order synapse weight parameter, that is, the first-order synapse weight parameter $w_1$, it is assumed that the first-order synapse weight parameter $w_1$ is unrelated to both a stimulation signal output by a neuron and a value of the third-order synapse weight parameter $w_3$, and is related only to the second-order synapse weight parameter $w_2$ that is one order higher than the first-order synapse weight parameter $w_1$. Moreover, at a moment $t_1$, the second-order synapse weight parameter $w_2$ exceeds a threshold of a corresponding second-order synapse weight such that the second-order synapse weight parameter $w_2$ can be activated and change. After the moment $t_1$, the second-order synapse weight parameter $w_2$ is less than the threshold of the corresponding second-order synapse weight, and the first-order synapse weight parameter $w_1$ is no longer activated such that the first-order synapse weight parameter $w_1$ meets the initial function after the moment $t_1$, and does not change with time.

Therefore, the initial function of the first-order synapse weight parameter $w_1$ may be set to the following formula (8):

$$w_1^0(t) = w_1^0(t_1) (t \geq t_1) \qquad (8)$$

Figure 9:
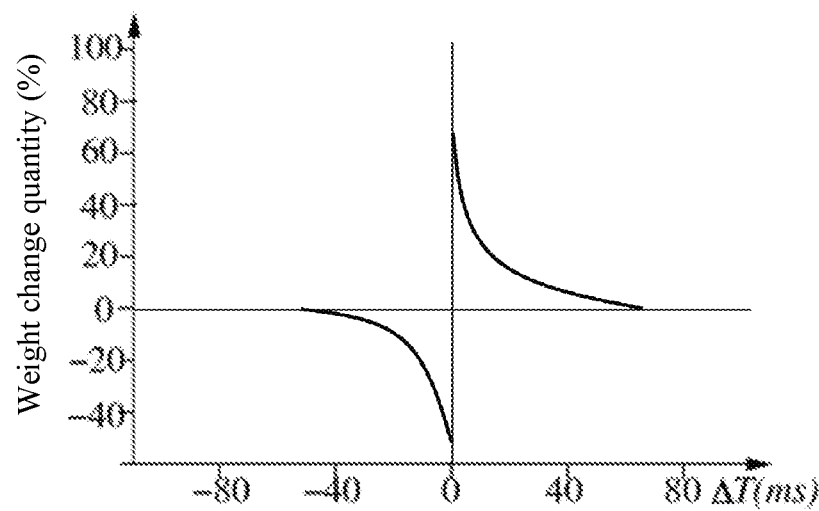
FIG. 9 is a schematic diagram of a curve of an STDP learning rule according to an embodiment of the present disclosure.

In this embodiment of the present disclosure, the three orders of synapse weight parameters ($w_1$, $w_2$, $w_3$) may be updated based on the following rules. An update rule of the third-order synapse weight parameter $w_3$ may be that the third-order synapse weight parameter $w_3$ changes when and only when an external stimulation signal exists; otherwise, formula (6) applies. If the third-order synapse weight parameter $w_3$ is stimulated by a signal at a moment t, the update rule of the third-order synapse weight parameter $w_3$ may be expressed as the following formula (9):

$$w_3(t) = w_3(t-1) + \Delta F_3(t) \qquad (9)$$

where $w_3(t-1)$ represents a value of the third-order synapse weight parameter at a previous moment, $\Delta F_3(t)$ represents an update quantity generated due to a stimulation effect of the stimulation signal on the third-order synapse weight parameter. Optionally, the update quantity $\Delta F_3(t)$ may be determined based on the learning rule and the stimulation signal. For example, the learning rule may be an STDP learning rule. As shown in FIG. 9, if information about a former neuron is generated before an activity of a latter neuron, a connection between the neurons is enhanced. Alternatively, if information about a former neuron is generated after an activity of a latter neuron, a connection between the neurons is weakened. $\Delta T$ represents a time difference of activities of the former neuron and the latter neuron. A value of $\Delta F_3(t)$ is related to an absolute value of the time difference $\Delta T$. A smaller absolute value indicates larger $\Delta F_3(t)$.

An update rule of the second-order synapse weight parameter $w_2$ may be that the second-order synapse weight parameter $w_2$ changes when and only when the third-order synapse weight parameter $w_3$ exceeds the threshold of the corresponding third-order synapse weight; otherwise, formula (7) applies. The update rule of the second-order synapse weight parameter $w_2$ may be expressed as the following formula (10):

$$w_2(t) = w_2(t-1) + \Delta w_{23}(t) \qquad (10)$$

where $w_2(t-1)$ represents a value of the second-order synapse weight parameter at a previous moment, $\Delta w_{23}(t)$ is a quantity of impact of the third-order synapse weight parameter $w_3$ on the second-order synapse weight parameter $w_2$, and $\Delta w_{23}(t)$ is related to the threshold of the third-order synapse weight, for example, $\Delta w_{23}(t)$ may be set to meet the following formula (11):

$$\Delta w_{23}(t) = f(w_3 - T_3) dt \qquad (11)$$

where $T_3$ represents the threshold of the third-order synapse weight corresponding to the third-order synapse weight parameter $w_3$.

An update rule of the first-order synapse weight parameter $w_1$ may be that the first-order synapse weight parameter $w_2$ changes when and only when the second-order synapse weight parameter $w_1$ exceeds the threshold of the corresponding second-order synapse weight; otherwise, formula (8) applies. The update rule of the first-order synapse weight parameter $w_1$ may be expressed as the following formula (12):

$$w_1(t) = w_1(t-1) + \Delta w_{12}(t) \qquad (12)$$

where $w_1(t-1)$ represents a value of the first-order synapse weight parameter at a previous moment, $\Delta w_{12}(t)$ is a quantity of impact of the second-order synapse weight parameter $w_2$ on the first-order synapse weight parameter $w_1$, and $\Delta w_{12}(t)$ is related to the threshold of the second-order synapse weight; for example, $\Delta w_{12}(t)$ may be set to meet the following formula (13):

$$\Delta w_{12}(t) = \int (w_2 - T_2) dt \tag{13}$$

where $T_2$ represents the threshold of the second-order synapse weight corresponding to the second-order synapse weight parameter $w_2$.

Figure 10:
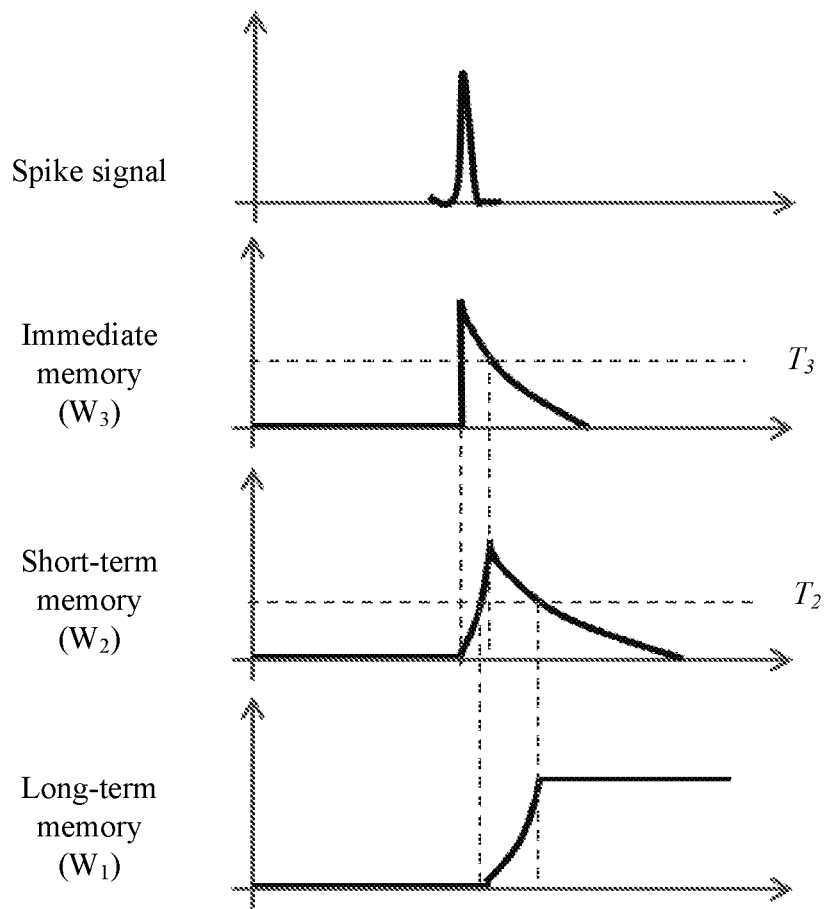
FIG. 10 is a schematic diagram of an application instance of three orders of synapse weight parameters according to an embodiment of the present disclosure.

Therefore, with a stimulation effect of a spike signal shown in FIG. 10, changes in the three orders of synapse weight parameters ($w_1$, $w_2$, $w_3$) may be shown in FIG. 10.

In this embodiment of the present disclosure, in addition to the foregoing embodiment, the method may be further applied to another application scenario. No limitation is set thereto in this embodiment of the present disclosure.

Optionally, in an embodiment, a function of the spiking neural network having a forgetting characteristic in this embodiment of the present disclosure is described below using a specific application instance of word memorization. For ease of description, a neural network having two orders of synapse weight parameters is used herein as an example for description. Each word recitation may be considered as an input of a spike signal. It is assumed that one person recites a same word once on each of a first day, a second day, a fourth day, a fifth day, and a sixth day; in other words, a spike signal is input to the two-order spiking neural network on each of the first day, the second day, the fourth day, the fifth day, and the sixth day. Theoretically, after reciting a new word, the person will quickly forget the word and can commit the word to memory after repeated recitations. The process can be implemented through simulation using the two-order spiking neural network in this embodiment of the present disclosure.

Figure 11:
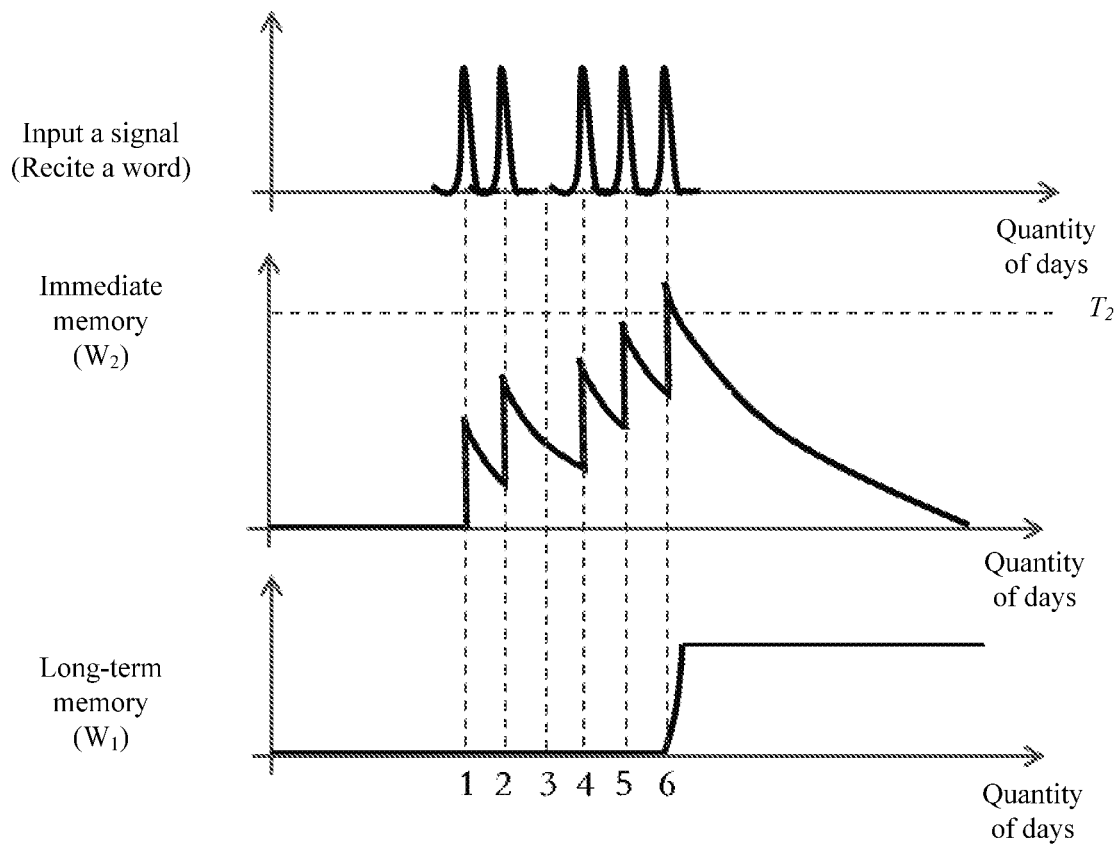
FIG. 11 is a schematic diagram of two orders of synapse weight parameters used for word memorization according to an embodiment of the present disclosure.

As shown in FIG. 11, recitation of a new word by a person may be considered as inputting a stimulation signal. Therefore, an immediate memory higher-order synapse weight parameter $w_2$ may be activated based on a learning rule. However, $w_2$ does not exceed a threshold $T_2$ corresponding to $w_2$. Therefore, a change in a long-term memory first-order synapse weight parameter $w_1$ is not triggered. In addition, the immediate memory second-order synapse weight parameter $w_2$ attenuates with time. However, the word is recited on the second day, the fourth day, the fifth day, and the sixth day again. In other words, new stimulation signals are input. As shown in FIG. 11, on the sixth day, the second-order synapse weight parameter $w_2$ exceeds the threshold $T_2$ corresponding to $w_2$, and long-term memory of the person is triggered. In other words, the first-order synapse weight parameter $w_1$ is activated. Therefore, the word can be permanently memorized.

Similarly, an application scenario such as hot news screening or key information obtaining may also be implemented through simulation using the neural network having a plurality of orders of synapse weight parameters and having a forgetting characteristic in this embodiment of the present disclosure.

Therefore, in the signal processing method based on a spiking neural network in this embodiment of the present disclosure, an input signal is processed using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved. In addition, various real-time and complex problems such as mode identification, natural language processing, and control and optimization may be completed using the neural network in this embodiment of the present disclosure, and the present disclosure has a wide application prospect. The spiking neural network having a forgetting characteristic gradually forgets learned information such as a secondary feature or background noise, and an eventually stored feature is a most important feature of a thing, and is more consistent with reality.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

The signal processing method based on a spiking neural network in the embodiments of the present disclosure is described above in detail with reference to FIG. 1 to FIG. 11. Signal processing apparatuses based on a spiking neural network in the embodiments of the present disclosure are described below with reference to FIG. 12 and FIG. 13.

Figure 12:
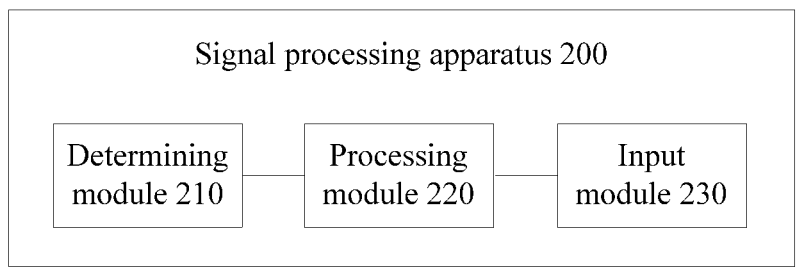
FIG. 12 is a schematic block diagram of a signal processing apparatus based on a spiking neural network according to an embodiment of the present disclosure.

As shown in FIG. 12, a signal processing apparatus 200 based on a spiking neural network in an embodiment of the present disclosure includes a determining module 210, configured to determine a first signal $F_1(t)$ output by a first neuron, a processing module 220, configured to process the first signal $F_1(t)$ using q orders of synapse weight parameters $w_q(t)$, $w_{q-1}(t)$, ..., (t), to obtain a second signal $F_2(t)$, where a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, q is a positive integer greater than 1, and $1 \leq x \leq q-1$, and an input module 230, configured to input the second signal $F_2(t)$ to a second neuron, where the second neuron is a next-layer neuron of the first neuron.

Therefore, the signal processing apparatus based on a spiking neural network in this embodiment of the present disclosure processes an input signal using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved.

Optionally, in an embodiment, an initial function $w_1^0(t)$ of a first-order synapse weight parameter of the q orders of synapse weight parameters does not attenuate with time.

Optionally, in an embodiment, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ meets a formula (1):

$$w_q(t_1) = w_q(t_1 - 1) + \Delta F_q(t_1) \tag{1}$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and an $x^{th}$-order synapse weight parameter $w_x(t_1)$ at the moment $t_1$ meets a formula (2):

$$w_x(t_1)=w_x(t_1-1)+\Delta F_x(t_1)+\Delta w_{x,x+1}(t_1)+\Delta w_{x,x+2}(t_1)+\ldots+\Delta w_{x,q}(t_1) \quad (2)$$

where $w_x(t_1-1)$ represents an $x^{th}$-order synapse weight parameter at the moment $t_1-1$, $\Delta F_x(t_1)$ is an update quantity determined based on the learning rule and a stimulation effect, at the moment $t_1$, of the first sub-signal $F_1(t_1)$ on the $x^{th}$-order synapse weight parameter $w_x(t_1-1)$ at the moment $t_1-1$, $\Delta w_{x,x+1}(t_1), \Delta w_{x,x+2}(t_1), \ldots, \Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

Optionally, in an embodiment, when an $(x+i)^{th}$-order synapse weight parameter $w_{x+i}(t_1)$ at the moment $t_1$ is greater than or equal to a threshold of an $(x+i)^{th}$-order synapse weight, $\Delta w_{x,x+i}(t_1)$ is not 0, or when an $(x+i)^{th}$-order synapse weight parameter $w_{x,x+i}(t_1)$ at the moment $t_1$ is less than a threshold of an $(x+i)^{th}$ synapse weight, $\Delta w_{x,x+i}(t_1)$ is equal to 0, and $i=1, 2, \ldots,$ or $q-x$.

Optionally, in an embodiment, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ satisfies a formula (3):

$$w_q(t_1)=w_q(t_1-1)+\Delta F_q(t_1) \quad (3)$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and when an $(x+1)^{th}$-order synapse weight parameter $w_{x+1}(t_1)$ at the moment $t_1$ is greater than or equal to a threshold of an $(x+1)^{th}$-order synapse weight, an $x^{th}$-order synapse weight parameter $w_x(t_1)$ at the moment $t_1$ satisfies a formula (4):

$$w_x(t_1)=w_x(t_1-1)+\Delta w_{x,x+1}(t_1) \quad (4)$$

where $w_x(t_1-1)$ represents an $x^{th}$-order synapse weight parameter at the moment $t_1-1$, $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$, or when an $(x+1)^{th}$-order synapse weight parameter $w_{x+1}(t_1)$ at the moment $t_1$ is less than a threshold of an $(x+1)^{th}$-order synapse weight, an $x^{th}$-order synapse weight parameter $w_x(t_1)$ at the moment $t_1$ meets an initial function $w_x^0(t_1)$.

Optionally, in some embodiments, the learning rule is a learning rule based on a biological feature or a supervised learning rule based on an error back propagation mechanism.

Optionally, in an embodiment, the processing module 220 is configured to determine a product of the first signal $F_1(t)$ and the first-order synapse weight parameter $w_1(t)$ as the second signal $F_2(t)$.

It should be understood that the foregoing operations and/or functions of modules in the signal processing apparatus 200 in this embodiment of the present disclosure are intended for implementing corresponding procedures of the methods in FIG. 1 to FIG. 11. For brevity, details are not described herein again.

It should be further understood that the determining module 210 and the processing module 220 in this embodiment of the present disclosure may be implemented using a processor or a processor-related circuit component, and the input module 230 may be implemented using a transceiver or a transceiver-related circuit component.

Figure 13:
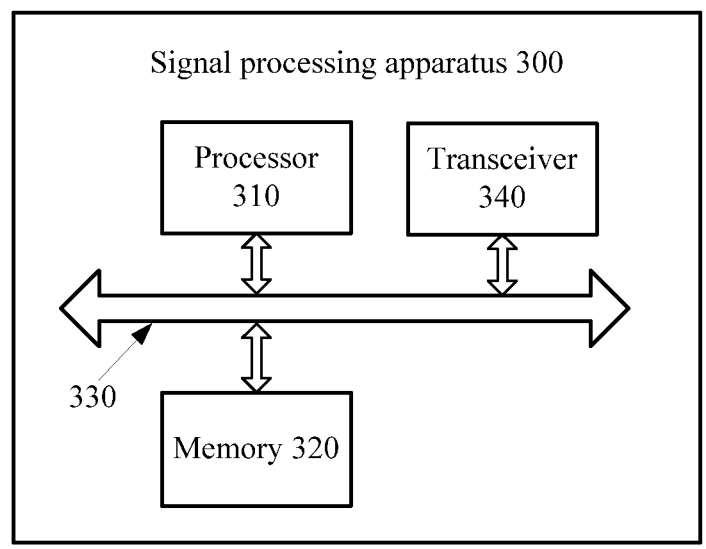
FIG. 13 is a schematic block diagram of a signal processing apparatus based on a spiking neural network according to another embodiment of the present disclosure.

As shown in FIG. 13, an embodiment of the present disclosure further provides a signal processing apparatus 300 based on a spiking neural network. The signal processing apparatus 300 includes a processor 310, a memory 320, a bus system 330, and a transceiver 340. The processor 310, the memory 320, and the transceiver 340 are connected using the bus system 330. The memory 320 is configured to store an instruction. The processor 310 is configured to execute the instruction stored in the memory 320, to control the transceiver 340 to receive and send a signal. When the processor 310 executes the instruction stored in the memory 320, the processor 310 is configured to determine a first signal $F_1(t)$ output by a first neuron, and process the first signal $F_1(t)$ using q orders of synapse weight parameters $w_q(t), w_{q-1}(t), \ldots, w_1(t)$, to obtain a second signal $F_2(t)$. A speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, q is a positive integer greater than 1, and $1 \leq x \leq q-1$. The transceiver 340 is configured to input the second signal $F_2(t)$ to a second neuron, where the second neuron is a next-layer neuron of the first neuron.

Therefore, the signal processing apparatus based on a spiking neural network in this embodiment of the present disclosure processes an input signal using a plurality of orders of synapse weight parameters, and initial functions of the orders of the synapse weight parameters attenuate with time at different speeds such that a forgetting characteristic of the neural network is simulated, some unimportant information such as a secondary feature or background noise is forgotten, the neural network is more consistent with reality, feature extraction becomes easier, and a problem of an excessively large information storage amount is further resolved.

Optionally, in an embodiment, an initial function $w_1^0(t)$ of a first-order synapse weight parameter of the q orders of synapse weight parameters does not attenuate with time.

Optionally, in an embodiment, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ meets a formula (1):

$$w_q(t_1)=w_q(t_1-1)+\Delta F_q(t_1) \quad (1)$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and an $x^{th}$-order synapse weight parameter $w_x(t_1)$ at the moment $t_1$ meets a formula (2):

$$w_x(t_1)=w_x(t_1-1)+\Delta F_x(t_1)+\Delta w_{x,x+1}(t_1)+\Delta w_{x,x+2}(t_1)+\ldots+\Delta w_{x,q}(t_1) \quad (2)$$

where $w_x(t_1-1)$ represents an $x^{th}$-order synapse weight parameter at the moment $t_1-1$, $\Delta F_x(t_1)$ is an update quantity determined based on the learning rule and a stimulation effect, at the moment $t_1$, of the first sub-signal $F_1(t_1)$ on the $x^{th}$-order synapse weight parameter $w_x(t_1-1)$ at the moment $t_1-1$, $\Delta w_{x,x+1}(t_1), \Delta w_{x,x+2}(t_1), \ldots, \Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

Optionally, in an embodiment, when an $(x+i)^{th}$-order synapse weight parameter $w_{x+i}(t_1)$ at the moment $t_1$ is greater than or equal to a threshold of an $(x+i)^{th}$-order synapse weight, $\Delta w_{x,x+i}(t_1)$ is not 0, or when an $(x+i)^{th}$-order synapse weight parameter at $w_{x+i}(t_1)$ at the moment $t_1$ is less than a threshold of an $(x+i)^{th}$ synapse weight, $\Delta w_{x,x+i}(t_1)$ is equal to 0, and i=1, 2, . . . , or q–x.

Optionally, in an embodiment, the first signal $F_1(t)$ includes a first sub-signal $F_1(t_1)$ output by the first neuron at a moment $t_1$, and a $q^{th}$-order synapse weight parameter $w_q(t_1)$ at the moment $t_1$ meets a formula (3):

$$w_q(t_1) = w_q(t_1-1) + \Delta F_q(t_1) \tag{3}$$

where $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect, at the moment $t_1$, of the first sub-signal $F_1(t_1)$ on the $q^{th}$-order synapse weight parameter $w_q(t_1-1)$ at the moment $t_1-1$, and when an $(x+1)^{th}$-order synapse weight parameter $w_{x+1}(t_1)$ at the moment $t_1$ is greater than or equal to a threshold of an $(x+1)^{th}$-order synapse weight, an $x^{th}$-order synapse weight parameter $w_x(t_1)$ at the moment $t_1$ meets a formula (4):

$$w_x(t_1) = w_x(t_1-1) + \Delta w_{x,x+1}(t_1) \tag{4}$$

where $w_x(t_1-1)$ represents an $x^{th}$-order synapse weight parameter at the moment $t_1-1$, $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$, or when an $(x+1)^{th}$-order synapse weight parameter $w_{x+1}(t_1)$ at the moment $t_1$ is less than a threshold of an $(x+1)^{th}$-order synapse weight, an $x^{th}$-order synapse weight parameter $w_x(t_1)$ at the moment $t_1$ meets an initial function $w_x^0(t_1)$.

Optionally, in an embodiment, the learning rule is a learning rule based on a biological feature or a supervised learning rule based on an error back propagation mechanism.

Optionally, in an embodiment, the processor 310 is configured to determine a product of the first signal $F_1(t)$ and the first-order synapse weight parameter $w_1(t)$ as the second signal $F_2(t)$.

It should be understood that the signal processing apparatus 300 based on a spiking neural network in this embodiment of the present disclosure can correspond to the signal processing apparatus 200 based on a spiking neural network in the embodiment of the present disclosure, and the foregoing operations and/or functions of the modules in the signal processing apparatus 300 are intended for implementing corresponding procedures of the methods in FIG. 1 to FIG. 11. For brevity, details are not described herein again.

It should be further understood that in this embodiment of the present disclosure, the processor may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory in this embodiment of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitation, a plurality of forms of RAMs can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM).

It should be noted that, when the processor is a general purpose processor, a DSP, an ASIC, an FPGA or another programmable logic device, a discrete gate or a transistor logic device, or a discrete hardware component, the memory (or a storage module) is integrated to the processor.

It should be noted that the memory of the system and the method that are described in the specification is to include, but is not limited to, these and any other appropriate types of memories.

It should be further understood that in this embodiment of the present disclosure, the bus system may include a power bus, a control bus, a status signal bus, and the like, in addition to a data bus. However, for clear description, various types of buses in FIG. 13 are marked as the bus system.

In an implementation process, steps in the foregoing methods can be implemented using a hardware integrated logical circuit in the processor, or using instructions in a form of software. The steps of the method disclosed with reference to the embodiments of the present disclosure may be directly performed by a hardware processor, or may be performed using a combination of hardware in the processor and a software module. A software module may be located in a mature storage medium in the art such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be further understood that the numbers in the specification are used for differentiation for ease of description, and are not used for limiting the scope of the embodiments of the present disclosure.

It should be understood that sequence numbers of the foregoing processes do not mean execution sequences in some embodiments. The execution sequences of the processes should be determined based on functions and internal logic of the processes, and should not be construed as any limitation on the implementation processes of the embodiments of the present disclosure.

A person of ordinary skill in the art may be aware that modules in examples described in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in this application, it should be understood that the disclosed apparatus and method may be implemented in other manners. For example, the described apparatus embodiment is merely an example. For example, the module division is merely logical function division and there may be another method of division in actual implementation. For example, a plurality of modules may be combined or integrated into another module, or some features may be ignored or not performed.

In addition, functional modules in the apparatus embodiments may be integrated into one processing unit, or the functional modules may physically exist in respective processing units, or two or more functional modules may be integrated into one processing unit.

The foregoing descriptions are merely specific implementations of this application, but are not intended to limit the protection scope of this application. Any variation or replacement readily determined by a person skilled in the art within the technical scope disclosed in the embodiments of the present disclosure shall fall within the protection scope of this application. Therefore, the protection scope of this application shall be subject to the protection scope of the claims.

What is claimed is:

1. A signal processing method implemented in a spiking neural network and comprising:

receiving, by a memristor, a first signal $F_1(t)$ output by a first neuron;

processing, by the memristor, the first signal $F_1(t)$ using q orders of synapse weight parameters $w_q(t)$, $w_{q-1}(t)$, ... $w_1(t)$ to obtain a second signal $F_2(t)$, wherein a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, wherein q is a positive integer greater than 1, and wherein $1 \leq x \leq q-1$; and outputting, by the memristor, the second signal $F_2(t)$ to a second neuron, wherein the second neuron is a next-layer neuron of the first neuron, wherein the first signal $F_1(t)$ comprises a first sub-signal $F_1(t_1)$ output by the first neuron at a moment $t_1$, wherein a $q^{th}$-order synapse weight parameter $w_q(t_1)$ at the moment $t_1$ meets the following condition:

$$w_q(t_1) = w_q(t_1-1) + \Delta F_q(t_1),$$

wherein $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity based on a learning rule and a stimulation effect at the moment $t_1$ of the first sub-signal $F_1(t_1)$ on the $q^{th}$-order synapse weight parameter $w_q(t_1-1)$ at the moment $t_1-1$, wherein an $x^{th}$-order synapse weight parameter $w_q(t_1)$ at the moment $t_1$ meets the following condition:

$$w_q(t_1) = w_q(t_1-1) + \Delta F_x(t_1) + \Delta w_{x,x+1}(t_1) + \Delta w_{x,x+2}(t_1) + \ldots + \Delta w_{x,q}(t_1),$$

wherein $w_x(t_1-1)$ represents an $x^{th}$-order synapse weight parameter at the moment $t_1-1$ and $\Delta F_x(t_1)$ is an update quantity based on the learning rule and the stimulation effect at the moment $t_1$ of the first sub-signal $F_1(t_1)$ on the $x^{th}$-order synapse weight parameter $w_x(t_1-1)$ at the moment $t_1-1$, and wherein $\Delta w_{x,x+1}(t_1)$, $\Delta w_{x,x+2}(t_1)$, ..., $\Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

2. The signal processing method of claim 1, wherein an initial function $w_1^0(t)$ of a first-order synapse weight parameter of the q orders of synapse weight parameters does not attenuate with time.

3. The signal processing method of claim 1, wherein an $(x+i)^{th}$-order synapse weight parameter $w_{x+1}(t_1)$ at the moment $t_1$ is greater than or equal to a threshold of an $(x+i)^{th}$-order synapse weight, and wherein $w_{x,x+i}(t_1)$ is not 0.

4. The signal processing method of claim 1, wherein an $(x+i)^{th}$-order synapse weight parameter $w_{x+i}(t_1)$ at the moment $t_1$ is less than a threshold of an $(x+i)^{th}$-order synapse weight, wherein $\Delta w_{x,x+i}(t_1)$ is equal to 0, and wherein $i=1, 2, \ldots$, or $q-x$.

5. The signal processing method of claim 1, wherein the learning rule is a learning rule based on a biological feature or a supervised learning rule based on an error back propagation mechanism.

6. The signal processing method of claim 1, wherein the first signal $F_1(t)$ comprises a first sub-signal $F_1(t_1)$ output by the first neuron at a moment $t_1$, and a $q^{th}$-order synapse weight parameter $w_q(t_1)$ at the moment $t_1$ meets the following condition:

$$w_q(t_1) = w_q(t_1-1) + \Delta F_q(t_1),$$

wherein $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect at the moment $t_1$ of the first sub-signal $F_1(t_1)$ on the $q^{th}$-order synapse weight parameter $w_q(t_1-1)$ at the moment $t_1-1$.

7. The signal processing method of claim 1, wherein an $(x+1)^{th}$-order synapse weight parameter $w_{x+1}(t_1)$ at the moment $t_1$ is greater than or equal to a threshold of an $(x+1)^{th}$-order synapse weight, wherein an $x^{th}$-order synapse weight parameter $w_x(t_1)$ at the moment $t_1$ meets the following condition:

$$w_x(t_1) = w_x(t_1-1) + \Delta w_{x,x+1}(t_1),$$

wherein $w_x(t_1-1)$ represents an $x^{th}$-order synapse weight parameter at the moment $t_1-1$, and wherein $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$.

8. The signal processing method of claim 7, wherein an $(x+1)^{th}$-order synapse weight parameter $w_{x+1}(t_1)$ at the moment $t_1$ is less than a threshold of an $(x+1)^{th}$-order synapse weight, and wherein an $x^{th}$-order synapse weight parameter $w_x(t_1)$ at the moment $t_1$ meets an initial function $w_x^0(t_1)$.

9. The signal processing method of claim 1, wherein processing, by the memristor, the first signal $F_1(t)$ using the q orders of synapse weight parameters $w_q(t)$, $w_{q-1}(t)$, ... $w_1(t)$ to obtain a second signal $F_2(t)$ comprises determining, by the memristor, a product of the first signal $F_1(t)$ and a first-order synapse weight parameter $w_1(t)$ as the second signal $F_2(t)$.

10. A spiking neural network comprising:
a first neuron configured to output a first signal $F_1(t)$;
a memristor coupled to the first neuron and configured to:
receive the first signal $F_1(t)$ output by the first neuron;
process the first signal $F_1(t)$ using q orders of synapse weight parameters $w_q(t)$, $w_{q-1}(t)$, ... $w_1(t)$ to obtain a second signal $F_2(t)$, wherein a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, wherein q is a positive integer greater than 1, and wherein $1 \le x \le q-1$; and
output the second signal $F_2(t)$; and
a second neuron coupled to the memristor and configured to receive the second signal $F_2(t)$, wherein the second neuron is a neuron in a layer immediately subsequent to a layer of the first neuron,
wherein the first signal $F_1(t)$ comprises a first sub-signal $F_1(t_1)$ output by the first neuron at a moment $t_1$,
wherein a $q^{th}$-order synapse weight parameter at the moment meets the following condition:

$$w_q(t_1) = w_q(t_1-1) + \Delta F_q(t_1),$$

wherein $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity based on a learning rule and a stimulation effect at the moment $t_1$ of the first sub-signal $F_1(t_1)$ on the $q^{th}$-order synapse weight parameter $w_q(t_1-1)$ at the moment $t_1-1$,
wherein an $x^{th}$-order synapse weight parameter $w_x(t_1)$ at the moment $t_1$ meets the following condition:

$$w_x(t_1) = w_x(t_1-1) + \Delta F_x(t_1) + \Delta w_{x,x+1}(t_1) + \Delta w_{x,x+2}(t_1) + \ldots + \Delta w_{x,q}(t_1),$$

wherein $w_x(t_1-1)$ represents an $x^{th}$-order synapse weight parameter at the moment $t_1-1$ and $\Delta F_x(t_1)$ is an update quantity based on the learning rule and the stimulation effect at the moment $t_1$ of the first sub-signal $F_1(t_1)$ on the $x^{th}$-order synapse weight parameter $w_x(t_1-1)$ at the moment $t_1-1$, and
wherein $\Delta w_{x,x+1}(t_1)$, $\Delta w_{x,x+2}(t_1)$, ..., $\Delta w_{x,q}(t_1)$ are respectively quantities of impact of an $(x+1)^{th}$-order synapse weight parameter, an $(x+2)^{th}$-order synapse weight parameter, ..., and the $q^{th}$-order synapse weight parameter that are at the moment $t_1$ on the $x^{th}$-order synapse weight parameter $w_x(t_1)$.

11. The spiking neural network of claim 10, wherein an initial function $w_1^0(t)$ of a first-order synapse weight parameter of the q orders of synapse weight parameters does not attenuate with time.

12. The spiking neural network of claim 10, wherein an $(x+i)^{th}$-order synapse weight parameter $w_{x+i}(t_1)$ at the moment $t_1$ is greater than or equal to a threshold of an $(x+i)^{th}$-order synapse weight, and wherein $\Delta w_{x,x+i}(t_1)$ is not 0.

13. The spiking neural network of claim 10, wherein an $(x+i)^{th}$-order synapse weight parameter $w_{x+i}(t_1)$ at the moment $t_1$ is less than a threshold of an $(x+i)^{th}$-order synapse weight, wherein $\Delta w_{x,x+i}(t_1)$ is equal to 0, and wherein $i=1, 2, \ldots$, or $q-x$.

14. The spiking neural network of claim 10, wherein the learning rule is a learning rule based on a biological feature or a supervised learning rule based on an error back propagation mechanism.

15. The spiking neural network of claim 10, wherein the first signal $F_1(t)$ comprises a first sub-signal $F_1(t_1)$ output by the first neuron at a moment $t_1$, and a $q^{th}$-order synapse weight parameter $w_q(t_1)$ at the moment $t_1$ meets the following condition:

$$w_q(t_1) = w_q(t_1-1) + \Delta F_q(t_1),$$

wherein $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity determined based on a learning rule and a stimulation effect at the moment $t_1$ of the first sub-signal $F_1(t_1)$ on the $q^{th}$-order synapse weight parameter $w_q(t_1-1)$ at the moment $t_1-1$.

16. The spiking neural network of claim 10, wherein an $(x+1)^{th}$-order synapse weight parameter $w_{x+1}(t_1)$ at the moment $t_1$ is greater than or equal to a threshold of an $(x+1)^{th}$-order synapse weight, wherein an $x^{th}$-order synapse weight parameter $w_x(t_1)$ at the moment $t_1$ meets the following condition:

$$w_x(t_1) = w_x(t_1-1) + \Delta w_{x,x+1}(t_1),$$

wherein $w_x(t_1-1)$ represents an $x^{th}$-order synapse weight parameter at the moment $t_1-1$, and wherein $\Delta w_{x,x+1}(t_1)$ is a quantity of impact of the $(x+1)^{th}$-order synapse weight parameter at the moment $t_1$ on the $x^{th}$-order synapse weight parameter $w_x(t_1)$.

17. The spiking neural network of claim 16, wherein an $(x+1)^{th}$-order synapse weight parameter $w_{x+1}(t_1)$ at the moment $t_1$ is less than a threshold of an $(x+1)^{th}$-order synapse weight, and wherein an $x^{th}$-order synapse weight parameter $w_x(t_1)$ at the moment $t_1$ meets an initial function $w_x^0(t_1)$.

18. The spiking neural network of claim 10, wherein the memristor is further configured to determine a product of the first signal $F_1(t)$ and a first-order synapse weight parameter $w_1(t)$ as the second signal $F_2(t)$.

19. A non-transitory computer-readable medium comprising instructions that, when executed by at least one processor, cause a spiking neural network to:
receive a first signal $F_1(t)$ output by a first neuron;
process the first signal $F_1(t)$ using q orders of synapse weight parameters $w_q(t)$, $w_{q-1}(t)$, ... $w_1(t)$ to obtain a second signal $F_2(t)$, wherein a speed at which an initial function $w_{x+1}^0(t)$ met by an $(x+1)^{th}$-order synapse weight parameter of the q orders of synapse weight parameters attenuates with time t is higher than a speed at which an initial function $w_x^0(t)$ met by an $x^{th}$-order synapse weight parameter attenuates with the time t, wherein q is a positive integer greater than 1, and wherein $1 \le x \le q-1$; and
output the second signal $F_2(t)$ to a second neuron, wherein the second neuron is a neuron in a layer immediately subsequent to a layer of the first neuron,
wherein the first signal $F_1(t)$ comprises a first sub-signal $F_1(t_1)$ output by the first neuron at a moment $t_1$,
wherein a $q^{th}$-order synapse weight parameter $w_q(t_1)$ at the moment $t_1$ meets the following condition:

$$w_q(t_1) = w_q(t_1-1) + \Delta F_q(t_1),$$

wherein $w_q(t_1-1)$ represents a $q^{th}$-order synapse weight parameter at a moment $t_1-1$, the moment $t_1-1$ is a previous moment of the moment $t_1$, and $\Delta F_q(t_1)$ is an update quantity based on a learning rule and a stimulation effect at the moment $t_1$ of the first sub-signal $F_1(t_1)$ on the $q^{th}$-order synapse weight parameter $w_q(t_1-1)$ at the moment $t_1-1$, wherein an $x^{th}$-order synapse weight parameter $w_x(t_1)$ at the moment $t_1$ meets the following condition:

$$w_x(t_1)=w_x(t_1-1)+\Delta F_x(t_1)+\Delta w_{x,x+1}(t_1)+\Delta w_{x,x+2}(t_1)+\ldots+\Delta w_{x,q}(t_1),$$

wherein $w_x(t_1-1)$ represents an $x^{th}$-order synapse weight parameter at the moment $t_1-1$ and $\Delta F_F(t_1)$ is an update quantity based on the learning rule and the stimulation effect at the moment $t_1$ of the first sub-signal $F_1(t_1)$ on the $x^{th}$-order synapse weight parameter $w_x(t_1-1)$ at the moment $t_1-1$, and wherein $\Delta w_{x,x+1}(t_1)$, $\Delta w_{x,x+2}(t_1)$, . . . , $\Delta w_{x,q}(t_1)$ are respectively quantities of impact of an $(x+1)^{th}$-order synapse weight parameter, an $(x+2)^{th}$-order synapse weight parameter, . . . , and the $q^{th}$-order synapse weight parameter that are at the moment $t_1$ on the $x^{th}$-order synapse weight parameter $w_x(t_1)$.

20. The non-transitory computer-readable medium of claim 19, wherein an initial function $w_1^0(t)$ of a first-order synapse weight parameter of the q orders of synapse weight parameters does not attenuate with time.

* * * * *

UNITED STATES PATENT AND TRADEMARK OFFICE
CERTIFICATE OF CORRECTION

| | | |
|---|---|---|
| PATENT NO. | : 11,308,386 B2 | |
| APPLICATION NO. | : 16/423750 | |
| DATED | : April 19, 2022 | |
| INVENTOR(S) | : Ming Wang, Zheng Yan and Xijun Xue | |

It is certified that error appears in the above-identified patent and that said Letters Patent is hereby corrected as shown below:

In the Claims

Claim 1, Column 23, Lines 45-46: "is a next-layer neuron of the first neuron," should read "is a neuron in a layer immediately subsequent to that of the first neuron,"

Claim 10, Column 25, Line 22: "weight parameter at" should read "weight parameter $w_q(t1)$ at"

Claim 10, Column 25, Line 23: "moment meets the following" should read "moment t1 meets the following"

Signed and Sealed this
Fourteenth Day of June, 2022

Katherine Kelly Vidal
*Director of the United States Patent and Trademark Office*